(12) United States Patent
Cornwell

(10) Patent No.: US 7,458,392 B2
(45) Date of Patent: Dec. 2, 2008

(54) SPRING ACTUATED CHECK VALVE

(75) Inventor: James P. Cornwell, Erie, PA (US)

(73) Assignee: R. Conrader Company, Erie, PA (US)

( * ) Notice: Subject to any disclaimer, the term of this patent is extended or adjusted under 35 U.S.C. 154(b) by 695 days.

(21) Appl. No.: 11/224,772

(22) Filed: Sep. 13, 2005

(65) Prior Publication Data

US 2007/0056636 A1    Mar. 15, 2007

(51) Int. Cl.
*F16K 15/14* (2006.01)
*F04B 53/10* (2006.01)

(52) U.S. Cl. .................. 137/529; 137/535; 137/860; 137/903; 417/566

(58) Field of Classification Search ............ 137/529, 137/535, 860, 903; 417/566
See application file for complete search history.

(56) References Cited

U.S. PATENT DOCUMENTS

| | | | | |
|---|---|---|---|---|
| 269,531 | A | * | 12/1882 | McGinley ............... 137/903 |
| 661,603 | A | * | 11/1900 | Gold ....................... 137/903 |
| 1,328,474 | A | * | 1/1920 | Astrom .................. 417/566 |
| 1,366,151 | A | | 1/1921 | Astrom |
| 1,413,568 | A | * | 4/1922 | Bjornstad ............... 417/566 |
| 1,515,998 | A | * | 11/1924 | Clark ..................... 137/903 |
| 1,854,773 | A | * | 4/1932 | Tannehill ............... 417/566 |
| 2,094,264 | A | * | 9/1937 | Crowley ................ 137/903 |
| 2,175,993 | A | * | 10/1939 | Lighton ................. 137/903 |
| 2,313,284 | A | * | 3/1943 | Valentine .............. 137/860 |
| 2,407,792 | A | * | 9/1946 | McMillan ............... 417/566 |
| 2,481,482 | A | | 9/1949 | Green .................... 251/127 |
| 2,561,009 | A | | 7/1951 | Byers et al. |
| 2,614,793 | A | | 10/1952 | Storm |
| 3,216,451 | A | | 11/1965 | Smallpeice ............ 137/608 |
| 3,297,106 | A | * | 1/1967 | Draxler et al. ......... 137/860 |
| 3,298,394 | A | | 1/1967 | Chorkey |
| 3,451,422 | A | | 6/1969 | Chorkey |
| 3,493,270 | A | | 2/1970 | Doerfler |
| 3,528,342 | A | * | 9/1970 | Simcock ................ 137/535 |
| 3,729,021 | A | | 4/1973 | Humphrey |
| 3,857,405 | A | | 12/1974 | Heideman |
| 3,924,831 | A | | 12/1975 | Andrich |

(Continued)

FOREIGN PATENT DOCUMENTS

FR    72.41808    6/1973

*Primary Examiner*—John Rivell
(74) *Attorney, Agent, or Firm*—Jon L. Woodard; Edward W. Goebel, Jr.; MacDonald Illig Jones & Britton LLP

(57) ABSTRACT

A check valve is for use in a fluid system. A valve body has an inlet end, a valve cavity, and an outlet end. A valve enables a valve assembly to control the flow of fluid therethrough. A plug of the valve assembly includes tapered and non-tapered sections, the tapered section having a cross section that increases in diameter in a direction that is downstream from the inlet end of the valve body. A sealing ring is mounted to reciprocate on the non-tapered section and an elastomeric actuation ring is mounted along the tapered section. The tapered section biases the actuation ring to a normal position, at which the actuation ring contacts and positions the sealing ring in contact with the valve body and the valve assembly to prevent fluid from flowing out the outlet end of the valve body.

102 Claims, 18 Drawing Sheets

U.S. PATENT DOCUMENTS

| | | |
|---|---|---|
| 4,000,857 A | 1/1977 | Moen |
| 4,237,935 A | 12/1980 | Delmonte et al. |
| 4,344,637 A | 8/1982 | Williams et al. |
| 4,416,287 A | 11/1983 | Riester |
| 4,418,924 A | 12/1983 | Mack |
| 4,549,565 A | 10/1985 | Short |
| 4,673,000 A | 6/1987 | Haerr et al. |
| 4,722,731 A | 2/1988 | Vailancourt |
| 4,795,173 A | 1/1989 | Osborne |
| 5,040,905 A | 8/1991 | Boyd |
| 5,111,736 A | 5/1992 | Buchberger et al. |
| 5,127,804 A | 7/1992 | Chappell |
| 5,237,971 A | 8/1993 | Worsley |
| 5,257,646 A | 11/1993 | Meyer |
| 5,299,598 A | 4/1994 | Quartana et al. |
| 5,762,103 A | 6/1998 | Gregoire |
| 5,782,269 A | 7/1998 | Seaney et al. |
| 5,839,765 A | 11/1998 | Carter et al. |
| 5,875,815 A | 3/1999 | Ungerecht et al. |
| 5,941,537 A | 8/1999 | Wallace et al. |
| 5,975,507 A | 11/1999 | Cotter |
| 6,186,477 B1 | 2/2001 | McCombs et al. |
| 6,298,873 B1 | 10/2001 | LeVey et al. |
| 2004/0084091 A1 | 5/2004 | Kerger et al. |
| 2004/0194835 A1 | 10/2004 | Gabriel |

\* cited by examiner

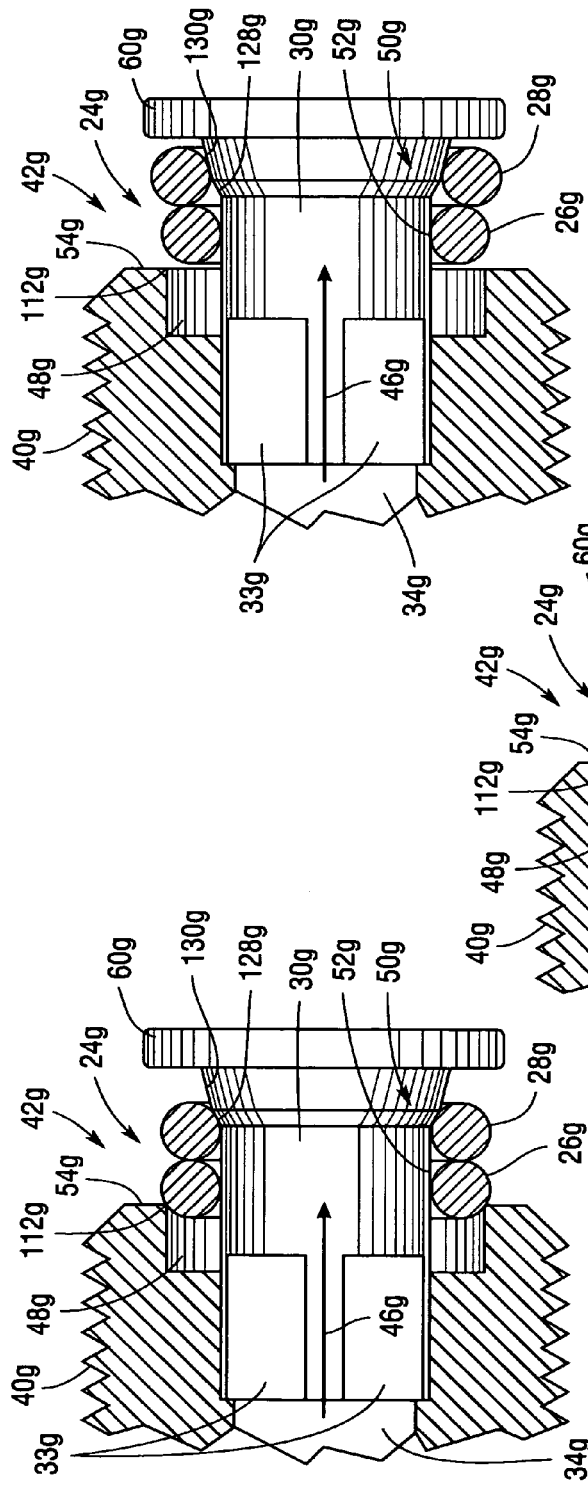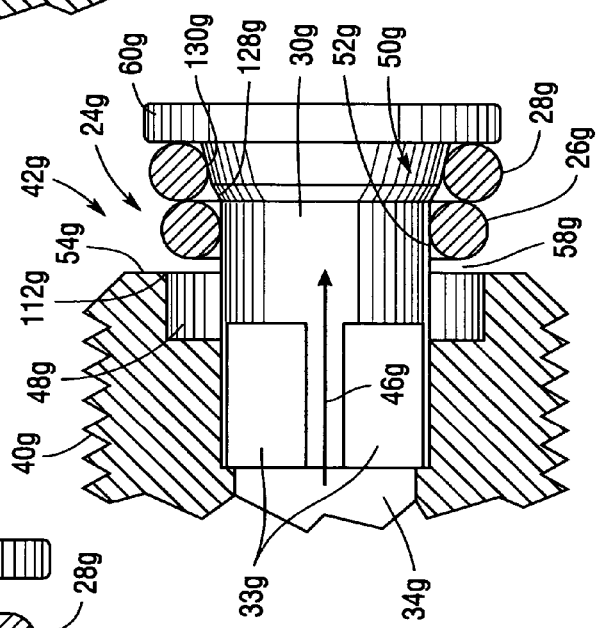

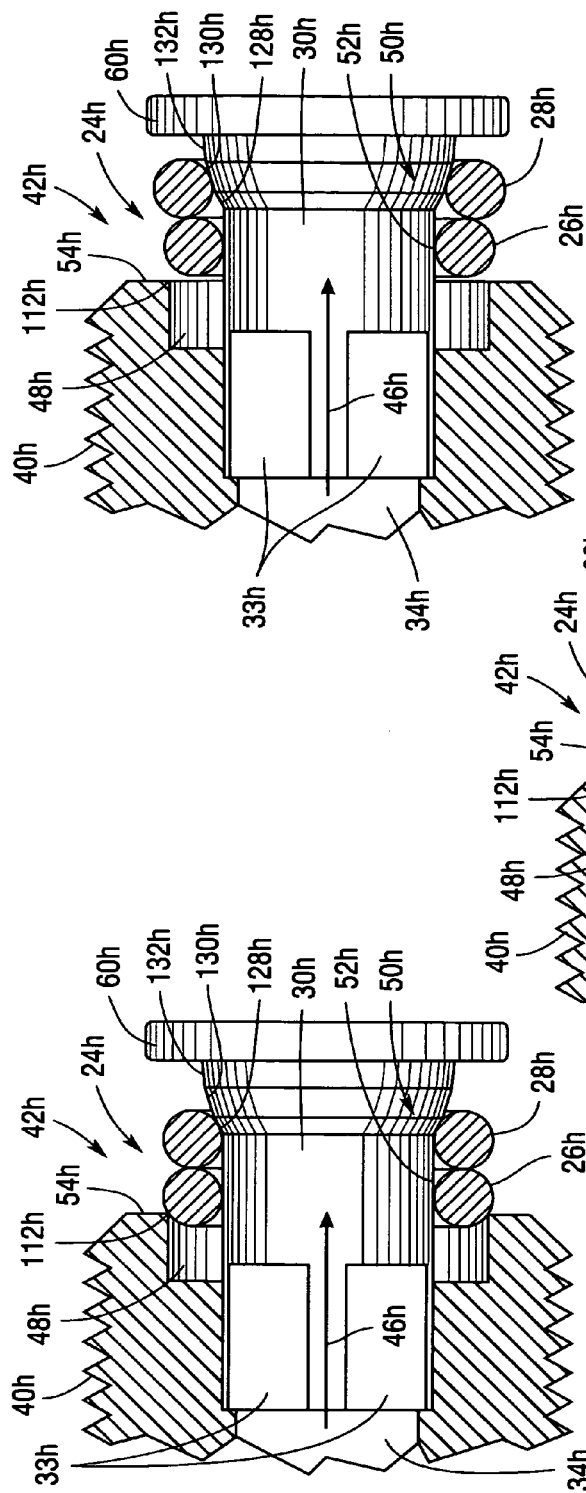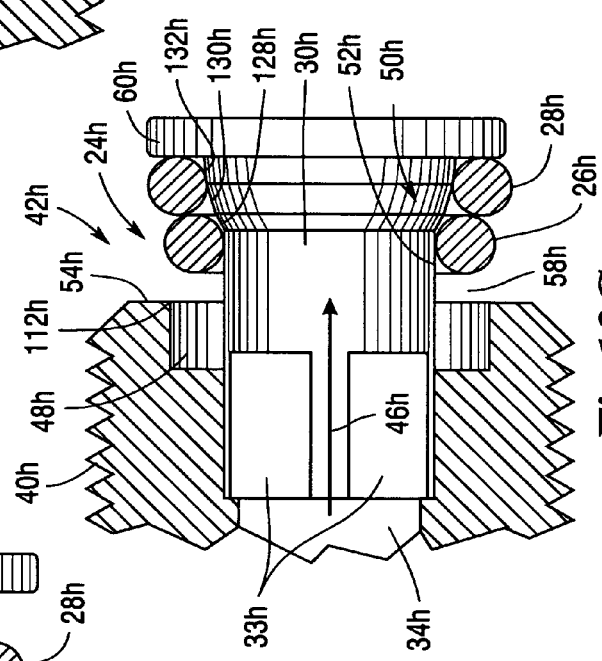

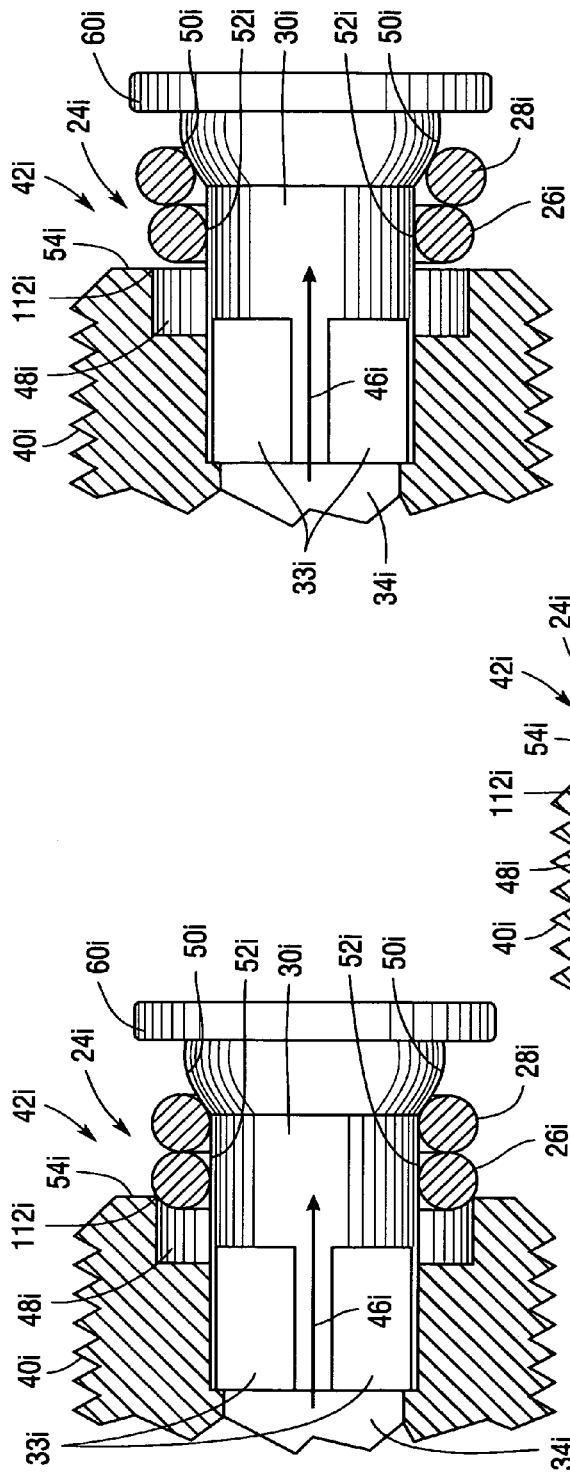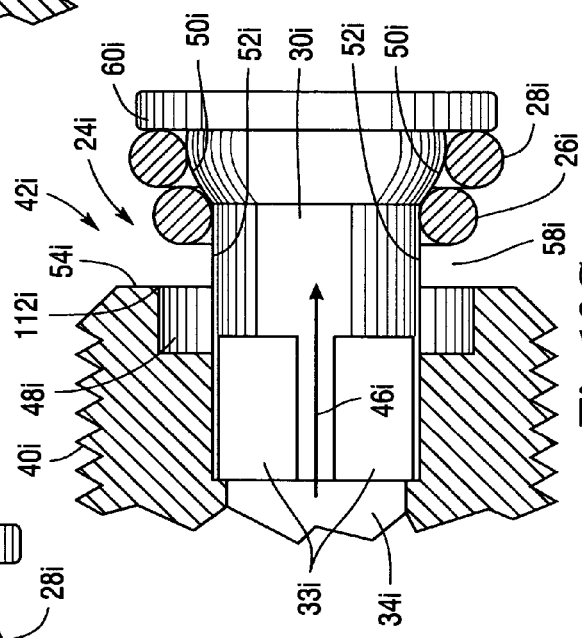

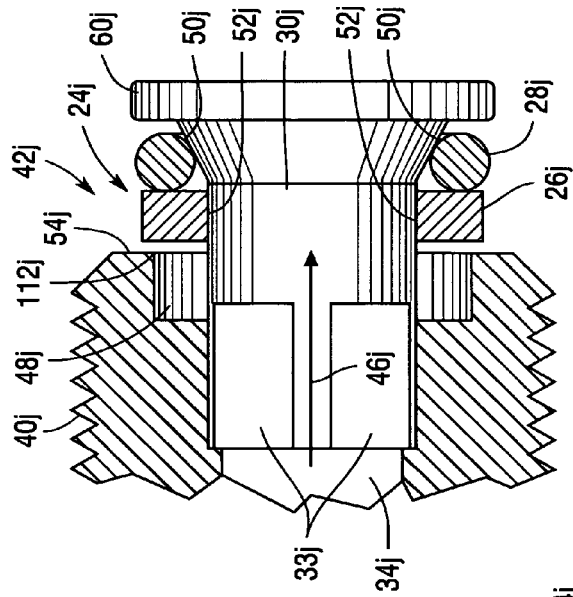
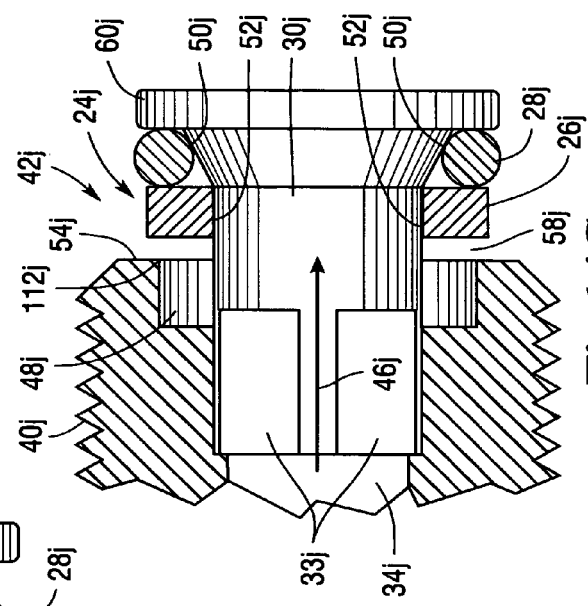
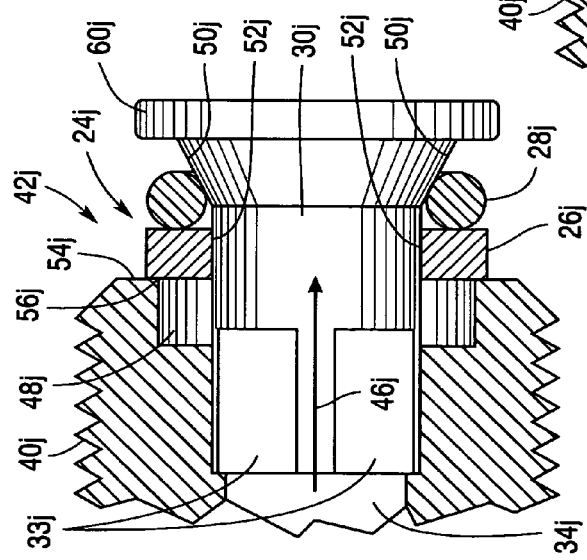

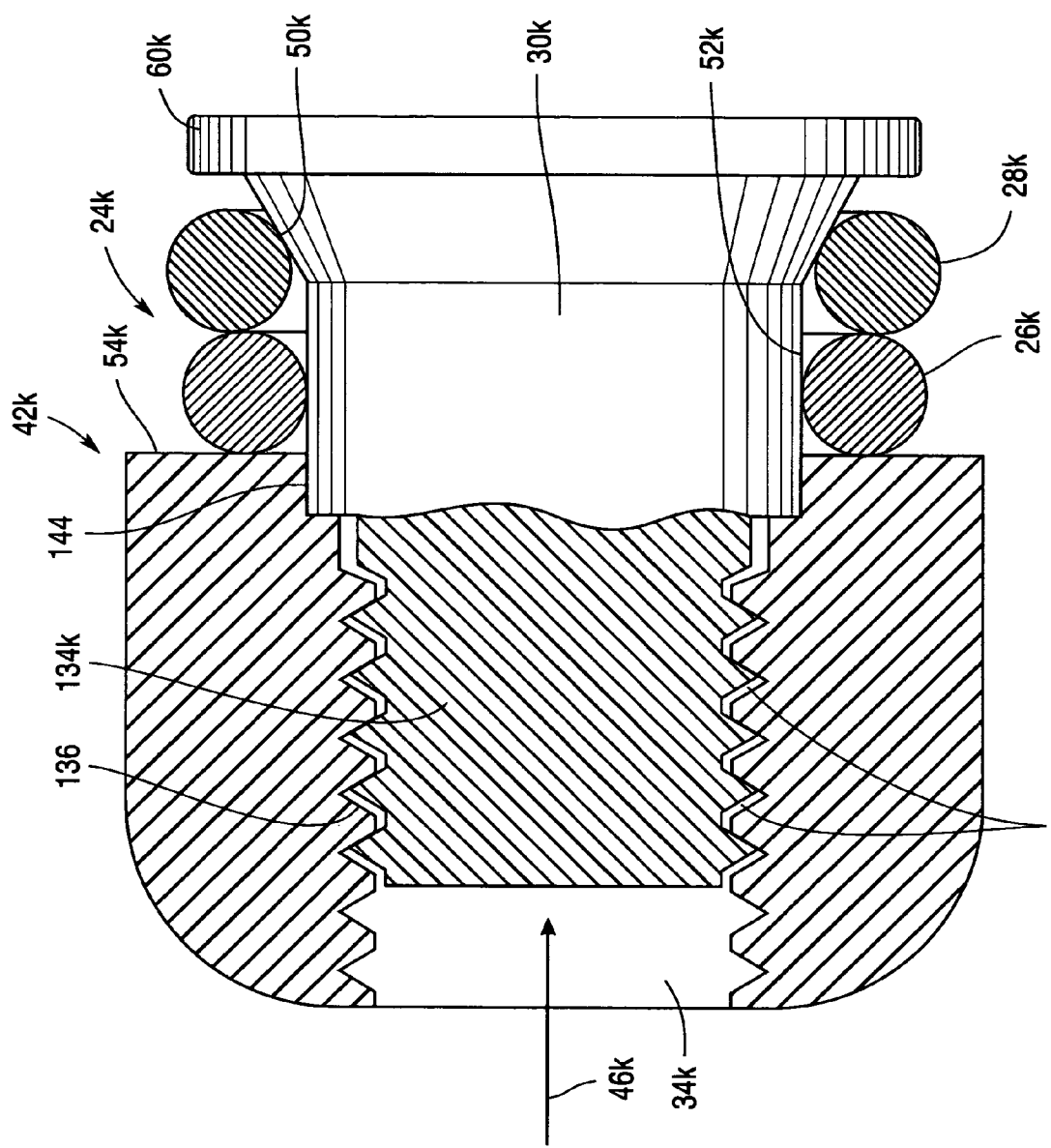

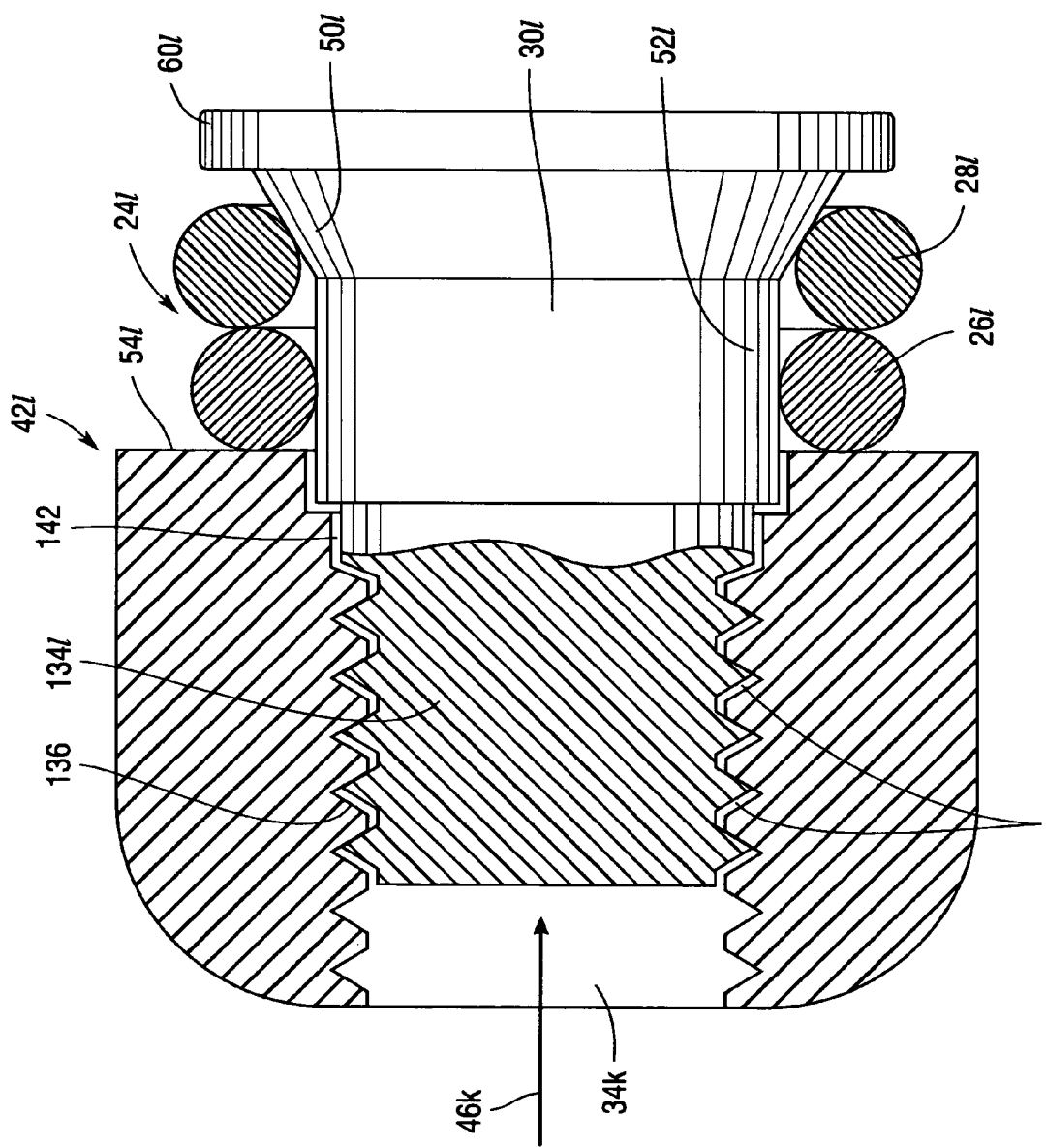

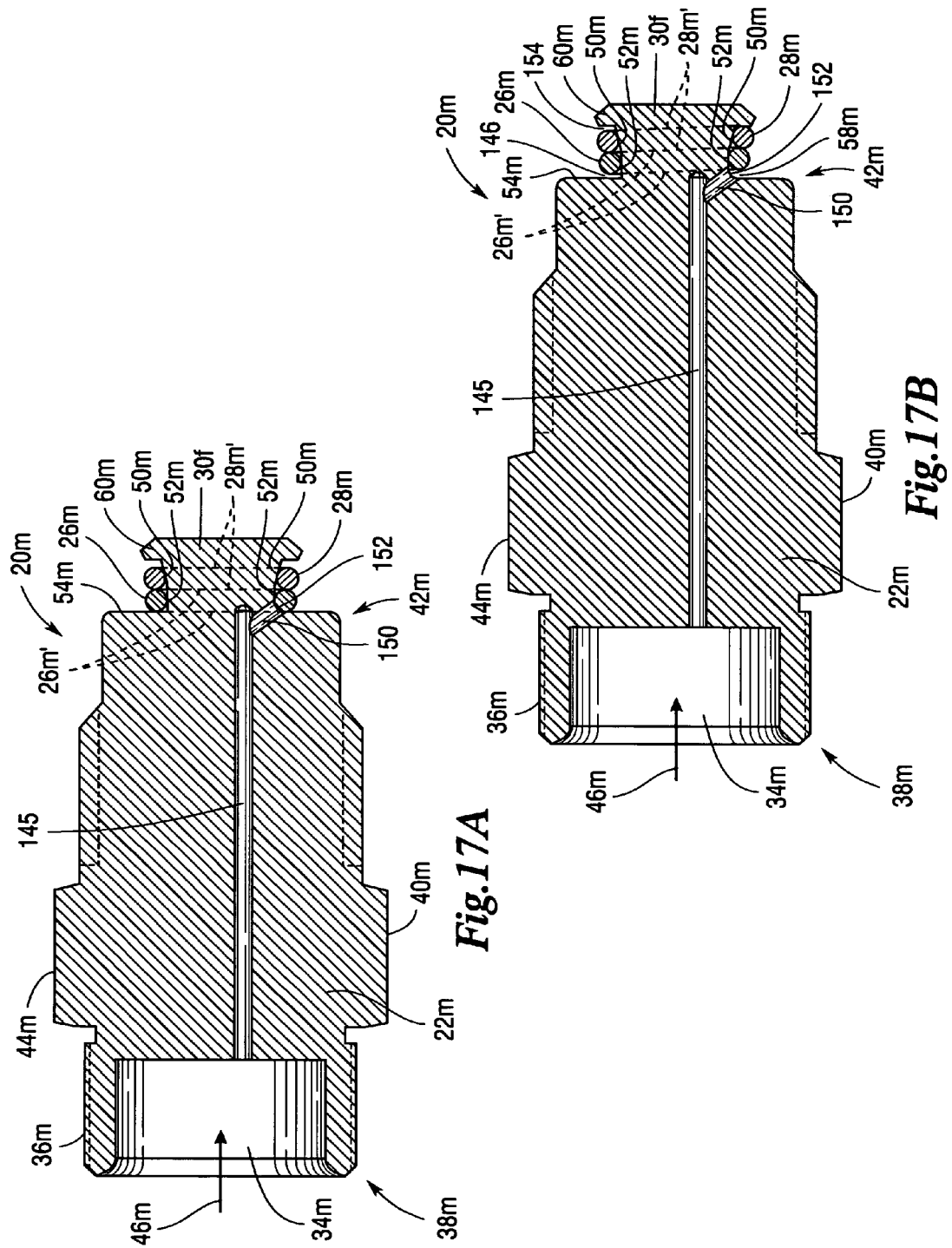

SPRING ACTUATED CHECK VALVE

BACKGROUND

Check valves are used in a variety of applications in fluid systems to allow for the unidirectional passage of upstream pressurized fluid, that is, pressurized fluid upstream of the outlet of a check valve, above a particular preselected threshold pressure level. Check valves of the expandable o-ring style type can include an elastomeric ring that can be mounted on a conical shaped tapered surface of a valve. The elastomeric ring usually has a memory shape and is mounted to constrict the tapered surface, causing the ring to be biased to a normal position on the tapered surface that has a smaller cross sectional diameter. When the elastomeric ring is in this normal position, the ring normally seals against the valve body to prevent the flow of fluid through the valve.

If fluid pressure downstream from the elastomeric ring is greater than fluid pressure upstream from the ring, the downstream pressure along with the bias of the elastomeric ring will cause the ring to return to the normal position, closing the valve. The check valve will also remain closed if upstream fluid pressure is greater than downstream pressure unless the upstream pressure exerts a total force against the elastomeric ring that is greater than a predetermined cracking force, opening the valve. The predetermined cracking pressure is typically dependent on the total biasing force of the ring's memory shape and the amount of surface area of the ring that is exposed to fluid pressure at a given time.

Expandable o-ring style check valves are desirable to use since they have an inherent advantage in that a check valve spring and sealing member are usually combined into a single elastomeric ring component. However, where a single elastomeric ring is used both as a valve spring and sealing member, a ring material must be selected that can allow the ring to perform adequately both in spring actuation and sealing capacities. It follows that the use of a single elastomeric ring may not allow for the use of ring shapes and materials optimal for both spring actuation and sealing.

SUMMARY

A check valve is for use in a fluid system such as an air compressor system, liquid pump or other fluid system that allows for the movement of fluid through the valve. A valve body has an inlet end through which a fluid, such as atmospheric air, enters the check valve, and an outlet end, through which fluid exits the check valve. A valve cavity within the valve body extends between about the inlet end and the outlet end of the valve. A valve assembly is located at a position relative to the valve cavity that enables the valve assembly to control the flow of fluid through the valve cavity.

A plug of the valve assembly includes both tapered and non-tapered sections, the tapered section having a cross section that increases in diameter in a direction that is downstream from the inlet end of the valve body. The valve assembly also includes a sealing ring that is mounted to reciprocate on the non-tapered section and an elastomeric actuation ring mounted along the tapered section. The tapered section biases the actuation ring to a normal position, at which the actuation ring contacts and positions the sealing ring in contact with the valve body and the valve assembly to prevent fluid from flowing downstream from the inlet end out the outlet end of the valve body.

The valve assembly allows fluid to flow downstream from the inlet and out the outlet end of the valve body when the fluid pump produces an amount of fluid pressure that is necessary to create a force against the sealing ring that is sufficient to cause the sealing ring to exert a force against the actuation ring and cause the sealing ring to be located at a position away from the valve body to create a preselected clearance between the valve body and sealing ring.

By including separate actuation and sealing rings, the invention allows each ring to have a shape or be constructed of a material that is better suited for performing the respective function of each ring. The combination of rings also allows the check valve to be better optimized to accommodate a particular liquid or gas, be better incorporated into in a particular system type, or be better adapted to a particular check valve application.

In some embodiments of the invention, the portion of the valve cavity, between about the inlet end of the valve body and the location where the sealing ring contacts the valve body, can have a minimum cross sectional area that allows the pressure of fluid flowing through the preselected clearance to be sufficient to continuously remove fluid from the valve cavity to prevent substantial accumulation of back pressure produced by the fluid pump upstream of the valve when the sealing ring is located at a position away from the valve body to create the preselected clearance between the valve body and sealing ring. Thus, in some embodiments, this ability to continuously remove fluid to prevent substantial accumulation of back pressure enables the accommodation of a process flow of fluid through the valve. The invention can also be incorporated in valves that are limited to accommodating non-process flows of fluid, such as leakage clearance flows and control flows, or applications where substantial accumulations of back pressure are acceptable or desirable.

Those skilled in the art will realize that this invention is capable of embodiments that are different from those shown and that details of the structure of the disclosed check valve can be changed in various manners without departing from the scope of this invention. Accordingly, the following drawings and descriptions are to be regarded as including such equivalent check valves as do not depart from the spirit and scope of the invention.

BRIEF DESCRIPTION OF THE DRAWINGS

For a more complete understanding and appreciation of this invention, and many of its advantages, reference will be made to the following detailed description taken in conjunction with the accompanying drawings.

FIG. 11A is a side cross sectional view of an outlet end of a check valve according to one embodiment of the invention having an actuation ring and sealing ring in normal positions;

FIG. 11B is a side cross sectional view of the check valve of FIG. 11A depicting a preselected clearance between the sealing ring and the valve body;

FIG. 11C is a side cross sectional view of the check valve of FIG. 11A depicting a preselected clearance that is a valve clearance between the sealing ring and the valve body;

FIG. 12A is a side cross sectional view of an outlet end of a check valve according to one embodiment of the invention having an actuation ring and sealing ring in normal positions;

FIG. 12B is a side cross sectional view of the check valve of FIG. 12A depicting a preselected clearance between the sealing ring and the valve body;

FIG. 12C is a side cross sectional view of the check valve of FIG. 12A depicting a preselected clearance that is a valve clearance between the sealing ring and the valve body;

FIG. 13A is a side cross sectional view of an outlet end of a check valve according to one embodiment of the invention having an actuation ring and sealing ring in normal positions;

FIG. 13B is a side cross sectional view of the check valve of FIG. 13A depicting a preselected clearance between the sealing ring and the valve body;

FIG. 13C is a side cross sectional view of the check valve of FIG. 13A depicting a preselected clearance that is a valve clearance between the sealing ring and the valve body;

FIG. 14A is a side cross sectional view of an outlet end of a check valve according to one embodiment of the invention having an actuation ring and sealing ring in normal positions;

FIG. 14B is a side cross sectional view of the check valve of FIG. 14A depicting a preselected clearance between the sealing ring and the valve body;

FIG. 14C is a side cross sectional view of the check valve of FIG. 14A depicting a preselected clearance that is a valve clearance between the sealing ring and the valve body;

FIG. 15A is a side cross sectional view of an outlet end of a check valve according to one embodiment of the invention having an actuation ring and sealing ring in normal positions;

FIG. 16A is a side cross sectional view of an outlet end of a check valve according to one embodiment of the invention having an actuation ring and sealing ring in normal positions;

FIG. 17A is a side cross sectional view of a check valve according to one embodiment of the invention having an actuation ring and sealing ring in normal positions; and FIG. 17B is a side cross sectional view of the check valve of FIG. 17A depicting a preselected clearance that is a valve clearance between the sealing ring and the valve body.

DETAILED DESCRIPTION

Figure 1:
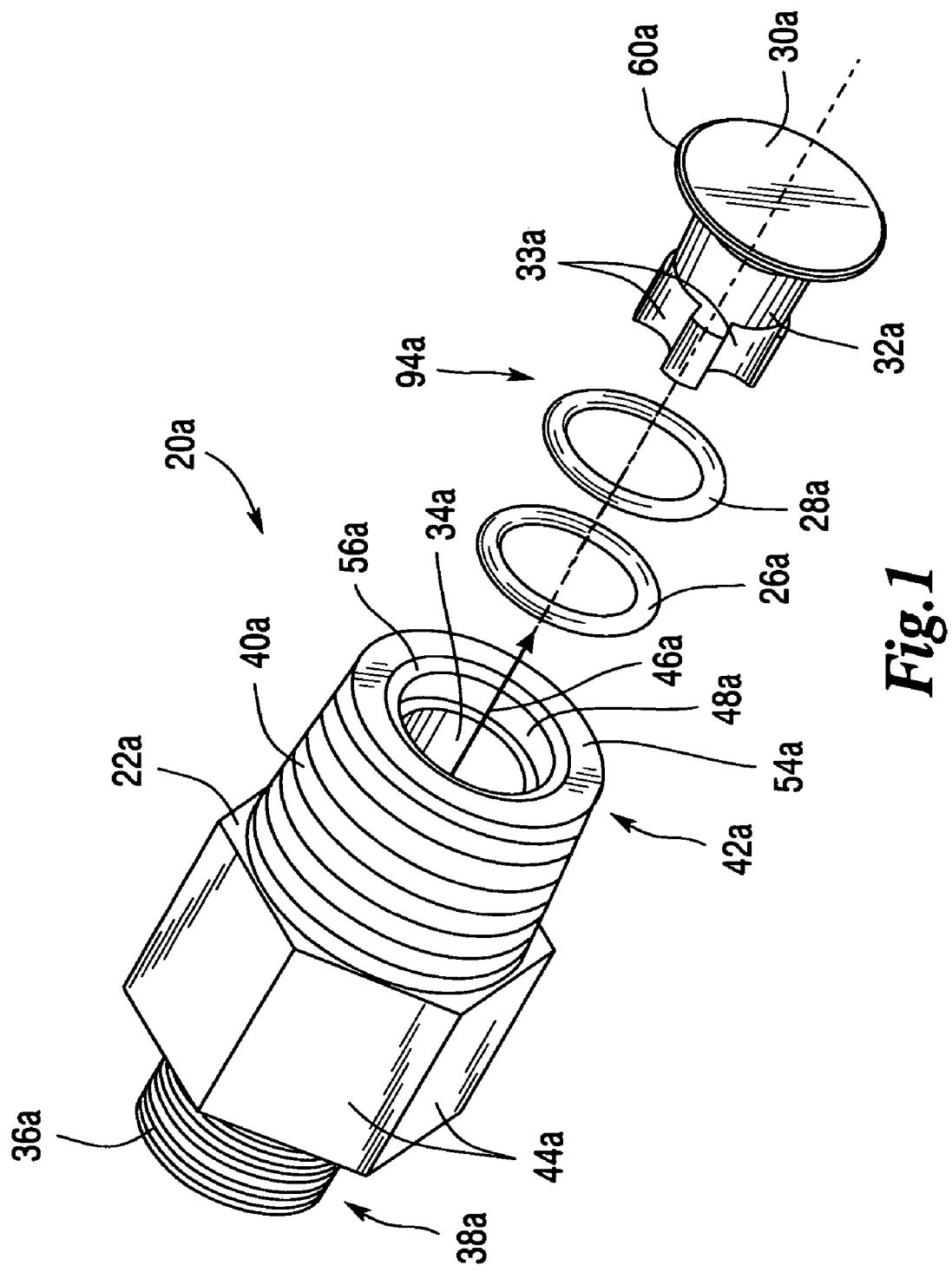
FIG. 1 is an exploded perspective view of a check valve according to one embodiment of the invention.

Referring to the drawings, similar reference numerals are used to designate the same or corresponding parts throughout the several embodiments and figures. Specific embodiment variations in corresponding parts are denoted with the addition of lower case letters and/or single or multiple prime indicators to reference numerals.

FIG. 1 is an exploded perspective view of a check valve 20a of the invention depicting an exterior view of a valve body 22a. A valve assembly 24a includes an elastomeric sealing ring 26a, actuation ring 28a, and plug 30a. The plug 30a includes a shaft 32a having multiple flutes 33a positioned to function as air passages when the plug 30a is inserted into a valve cavity 34a of the valve body 22a. The valve body 22a includes upstream threads 36a located at an inlet end 38a of the valve body 22a and downstream threads 40a located at an outlet end 42a of the valve body 22a. The upstream and downstream threads 36a and 40a allow for attachment to other components of a fluid system along a path of flowing fluid. Engagement surfaces 44a allow for installation of the valve body 22a into the fluid system using a wrench or other suitable installation tool.

Figure 2B:
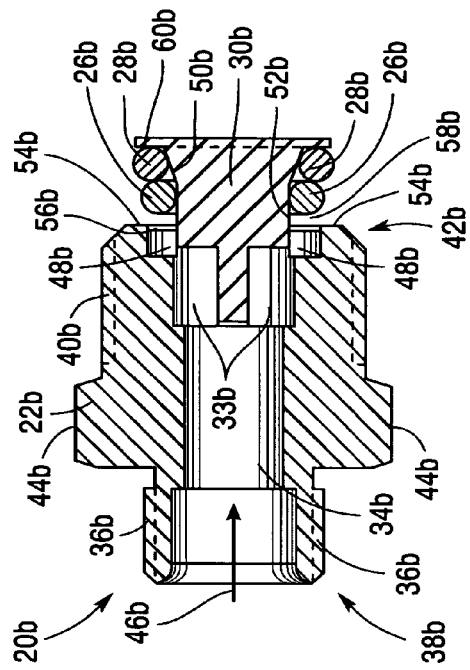
FIG. 2B is a side cross sectional view of the check valve of FIG. 1 depicting a preselected clearance that is a valve clearance between the sealing ring and the valve body.
Figure 3B:
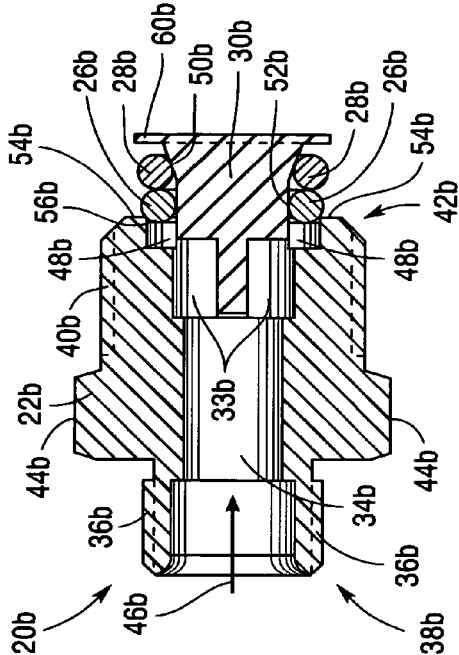
FIG. 3B is a side cross sectional view of the check valve of FIG. 3A depicting a preselected clearance that is a valve clearance between the sealing ring and the valve body.
Figure 2A:
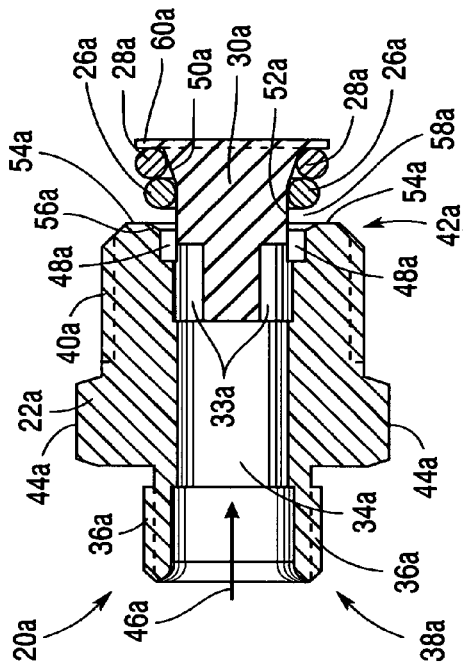
FIG. 2A is a side cross sectional view of the check valve of FIG. 1 depicting an elastomeric actuation ring and sealing ring in a normal position.

As best understood with reference to the assembled side cross sectional view of the check valve 20a depicted in FIGS. 2A and 2B, the valve cavity 34a extends through the valve body 22a from the inlet end 38a to the outlet end 42a and is intended to allow air to pass in a direction 46a that is downstream from the inlet end 38a. A pressure chamber 48a is the portion of the valve cavity 34a that is located upstream from and adjacent the sealing ring 26a.

The plug 30a includes a tapered section 50a and a non-tapered section 52a. The tapered section 50a has a cross section that increases in diameter in the direction 46a, that is away from the face 54a of the valve body 22a and downstream from the inlet end 38a of the valve body 22a. The actuation ring 28a is mounted around the plug 30a to reciprocate on the tapered section 50a. Due to an elastic spring force creating a memory shape, the internal diameter of the actuation ring 28a, when assuming its memory shape, is slightly less than the smallest diameter of the tapered section 50a that the actuation ring 28a surrounds when positioned along the tapered section 50a. As a result, the elastomeric seal 74a maintains a sealing fit against the tapered section 50a to prevent the passage of air therebetween. The memory shape of the actuation ring 28a also serves to bias the actuation ring 28a to move along the tapered section 50a to a normal position where the actuation ring 28a is located at or toward the smallest diameter of the tapered section 50a, as depicted in FIG. 2A.

The sealing ring 26a is mounted around the plug 30a to reciprocate on the non-tapered section 52a. When the actuation ring 28a is located at the normal position, the positioning of the actuation ring 28a and its contact with the sealing ring 26a also causes the sealing ring 26a to move along the non-tapered section 52a to a normal position as depicted in FIG. 2A. When the sealing ring 26a and actuation ring 28a are in the normal positions, the sealing ring 26a contacts the valve body 22a at an inside chamfer 56a of the valve cavity 34a. The chamfer 56a has a cross section that increases in diameter in the direction 46a that is downstream from the inlet end 38a of the valve body 22a. While the sealing ring 26a is in the normal position, the curvature of the sealing ring 26a partially fits into and seals with the chamfer 56a, preventing the flow of air therebetween. Since the sealing ring 26a, when in contact with the chamfer 56a, seals against both the valve body 22a and the actuation ring 28a, the sealing ring 26a prevents the passage of air through the outlet end 42a when in the normal position to close the check valve 20a.

When the sealing ring 26a moves along the non-tapered section 52a in the downstream direction 46a, the sealing ring 26a pushes against the actuation ring 28a to move it in the downstream direction 46a on the tapered section 50a. The tapered section 50a expands the actuation ring 28a in an outwardly radial direction from the tapered section 50a, as shown in FIG. 2B. The memory shape of the actuation ring 28a provides a spring force that opposes this radial expansion, biasing the actuation and sealing rings 28a and 26a to the normal positions shown in FIG. 2A.

Consider the check valve 20a when used with an air compressor system in which a compressor pump (not shown in FIGS. 2A and 2B) forces air to enter the check valve 20a through the inlet end 38a. Referring to FIG. 2A, as the compressor pump begins to pressurize the valve cavity 34a, the amount of force exerted by the increased pressure against the sealing ring 26a is directly related to the amount of surface area of the sealing ring 26a that is exposed to the amount of pressure produced by the compressor pump and present in the valve cavity 34a. A cracking pressure is the minimum level of air pressure that must be present in the valve cavity 34a to create a cracking force against the sealing ring 26a. Such force is required to initially move the sealing ring 26a against the biasing force of the actuation ring 28a and away from contact with the valve body 22a toward a position that establishes a preselected clearance between the sealing ring 74a and valve body 22a.

The position of the sealing ring 26a on the non-tapered section 50a of the plug 30a exposes the sealing ring 26a to air pressure that is present throughout the valve cavity 34a, including the flutes 33a and pressure chamber 48a. Thus, the actual amount of force that the sealing ring 26a is subjected to is a result of the air pressure within the check valve 20a. The sealing ring 26a in turn exerts a force against the bias of the actuation ring 28a. When a cracking force is exerted against the sealing ring 26a, both the sealing ring 26a and actuation ring 28a move in the downstream direction 46a against the bias of the actuation ring 28a to create the preselected clearance between the sealing ring 26a and valve body 22a. Since the biasing force of the actuation ring 28a is created by the memory shape of the actuation ring 28a as it is stretched in a radial direction by the tapered section 50a, the maintenance of the preselected clearance continues to depend on the actual force exerted by the air pressure against the sealing ring 26a and actuation ring 28a. This remains true even if the magnitude of the force is not directly and proportionately related to the magnitude of air pressure in the valve cavity 34a.

Comparing FIGS. 2A and 2B, when the air pressure within the valve cavity 34a of the closed check valve 20a reaches the cracking pressure to exert a cracking force against the sealing ring 26a, the sealing ring 26a loses contact with the chamfer 56a. As the sealing ring 26a moves away from contact with the chamfer 56a, an increased amount of surface area of the sealing ring 26a becomes exposed to upstream air pressure from the compressor pump. Some surface area of the actuation ring 28a also becomes initially exposed to upstream air pressure. Since the force exerted against the sealing ring 26a is directly related to the amount of surface area that is exposed to air pressure moving downstream from the inlet end 38a, the amount of force exerted against the sealing ring 26a will increase in direct proportion to the increase in the amount of surface area that becomes exposed due to the lost contact between the sealing ring 26a and chamfer 56a. Therefore, once the sealing ring 26a moves out of contact with the chamfer 56a, the amount of force exerted against the sealing ring 26a will increase by virtue of the increased amount of exposed surface area of the sealing ring 26a, even if the amount of air pressure produced by the compressor pump does not itself increase further.

Once the contact between the sealing ring 26a and chamfer 56a is lost, the subsequent movement of air through the open valve 20a past the sealing ring 26a will also create a dynamic force, in addition to the force produced by the upstream air pressure itself, that will further increase the total amount of force that is exerted against the sealing ring 26a. Since the lost contact between the sealing ring 26a and chamfer 56a also results in the actuation ring 28a becoming initially exposed to upstream air pressure, an additional amount of force, directly related to the amount of area of the actuation ring 28a exposed to upstream air moving in the downstream direction 46a, will be exerted against the actuation ring 28a as well. This additional force against the actuation ring 28a is added to the force exerted by the sealing ring 26a to comprise the total force acting against the bias of the actuation ring 28a after it has moved on the tapered section 50a in the downstream direction 46a.

Due to the increased total forces that result from the lost contact between the chamfer 56a and sealing ring 26a, it may be possible to reduce the air pressure produced by the air compressor to a level that is below the cracking pressure, once the sealing ring 26a and chamfer 56a are out of contact, without causing the check valve 20a to close. However, due to the spring force of the actuation ring 28a, the total force actually exerted against the sealing ring 26a and actuation ring 28a that is necessary to keep the sealing ring 26a out of contact with the chamfer 56a and maintain a preselected clearance must be at least as great as the cracking force, which is the total force exerted against the sealing ring 26a and actuation ring 26a by the cracking pressure produced by the compressor pump when the sealing ring 26a initially moves out of contact with the chamfer 56a. If at any time the total force exerted against the sealing ring 26a and actuation ring 28a falls below the cracking force, the spring force of the actuation ring 28a will again cause the sealing ring 26a to seal against the chamfer 56a and close the check valve 70a.

If the force exerted against the sealing and actuation rings 26a and 28a continues to increase beyond the cracking force after the sealing ring 26a and chamfer 56a lose contact, the sealing ring 26a will continue to move along the non-tapered section 52a and the actuation ring 28a will continue to move along the tapered section until the check valve 20a is opened fully and has reached a maximum preselected clearance or a "valve clearance" 58*a* between sealing ring 28*a* and valve body 22*a*, as depicted in FIG. 2B. The minimum amount of air pressure that the compressor pump must produce and maintain in the valve cavity 34*a* of the check valve 20*a* to create sufficient clearance force against the sealing and actuation rings 26*a* and 28*a* and maintain the check valve 20*a* in the fully open position is the clearance pressure of the check valve 20*a*. When the check valve 20*a* is fully open, the increased total amount of clearance force exerted against the sealing ring 24*a* is partly due to the increased amount of surface area of the sealing and actuation rings 26*a* and 28*a* exposed to air from the compressor and also partly due to the dynamic force of the air as it passes the sealing and actuation rings 26*a* and 28*a*.

When opened fully, the check valve 20*a* restricts further movement of the sealing and actuation rings 26*a* and 28*a* with a restrictor 60*a*, which impedes further radial stretching and movement of the actuation ring 28*a* in the downstream direction 46*a*. In this position, a valve clearance 58*a* exists between the valve body 22*a* and the sealing ring 26*a*, which is the maximum preselected clearance that the check valve 20*a* provides for the passage of air from the valve cavity 34*a* out the outlet end 42*a* of the valve body 22*a*.

Since the total amount of force exerted against the sealing and actuation rings 26*a* and 28*a* increases due to increased exposed surface area of the sealing and actuation rings 26*a* and 28*a* due to the dynamic forces of moving air, for some embodiments of the invention, the amount of air pressure that must be maintained in the valve cavity 34*a* to maintain the check valve 20*a* in a fully open position and to maintain the valve clearance 58*a* between the valve body 22*a* and the sealing ring 26*a* may be an amount that is substantially less than the cracking pressure.

With the inclusion of separate actuation and sealing rings, the invention allows each ring to be constructed of a material that is better suited for performing the respective function of each ring. The combination of rings also allows the check valve to be better optimized to accommodate a particular liquid or gas, be better incorporated into in a particular system type, or be better adapted to a particular check valve application.

In one example, a suitable combination includes the use of a silicone elastomer actuation ring with a Teflon sealing ring for a check valve used in an air compressor system. Such combination is evaluated for the highly elastomeric, high-temperature resistance, viscosity-retaining, and hardening resistance properties of silicone, making silicone highly suited for use as an actuation ring. Other suitable actuation ring materials for air compressor systems include nitrile elastomers and viton elastomers. Nitrile and viton elastomers can also be appropriately implemented in actuation rings of check valves used in liquid systems such as those that accommodate oil and water.

However, in some check valve applications, such as those that accommodate liquid fluids such as oil or water, silicone is considered to be less effective as a sealing material due to its tendency to swell and its relatively low tear resistance. In comparison, Teflon, though lacking the highly elastic properties of silicone, exhibits resistance swelling, a low coefficient of friction, and effective sealing properties enabling the material to more effectively reciprocate along a non-tapered section of a plug of the invention and seal against a valve body of the invention. Although some properties of silicone can be improved with the addition of appropriate additives or when silicone is incorporated in certain gasket forms, Teflon is often considered superior as a sealing ring in such liquid-accommodating applications.

Other suitable sealing ring materials for both air compressor systems and liquid accommodating systems such as water and oil pump systems include hard viton elastomers, hard nitrate elastomers, and stainless steel. Brass is also considered suitable as a sealing ring material for some air compressor system applications.

Some types of materials, such as Aflas, include multiple material varieties that can be separately incorporated as either sealing rings, actuation rings, or both. However, such materials are often expensive and are therefore optimal only in highly specific applications.

Some embodiments of the invention can be sized with sufficient cross sectional clearances to prevent substantial accumulations of fluid backpressure upstream of the valve. This can be true regardless of whether the pumped fluid creating the backpressure is liquid or gas. For example, consider the check valve 20*a* of FIGS. 2A and B used with a fluid pump that is a compressor pump of an air compressor system. Referring to FIG. 2B, the portion of the valve cavity 34*a*, that is between about the inlet end 38*a* and about the location where the sealing ring 26*a* contacts the valve body 22*a* at the chamfer 56*a*, is sized to have a cross sectional area that allows the pressure of air flowing through the valve clearance 58*a* to be sufficient to continuously remove air from the valve cavity 34*a* so as to prevent a substantial accumulation of back pressure produced by the air compressor upstream of the check valve 20*a*, when repeated cycles of the compressor pump's compression cylinder repeatedly cause the sealing ring 26*a* and actuation ring 28*a* to be located at a position away from the valve body 22*a* to create the preselected valve clearance 58*a*. This holds true as the compressor pump maintains levels of air pressure in the valve cavity 34*a* up to and including the clearance pressure, even if the clearance pressure is greater than the cracking pressure. Since in FIG. 2B, the location where the sealing ring 28*a* contacts the body 22*a* is the chamfer 56*a* and since the pressure chamber 48*a* of the valve cavity 34*a* is directly adjacent the chamfer 56*a*, the valve cavity 34*a* is directly open to clearances between the valve body 22*a* and sealing ring 26*a* via the flutes 33*a* whenever the valve 20*a* is partially or fully open.

There will be a continuous flow of air from the valve cavity 34*a* through the clearance between the valve body 22*a* and sealing ring 26*a* so long as the total force exerted on the sealing ring 26*a* and actuation ring 28*a* is at least as great as the clearance force. This configuration removes the possibility that air pressure within the pressure chamber 48*a* might "starve" or decrease at a rate that is greater than the pressure supplied by the valve cavity 34*a*, so that air pressure from the valve cavity 34*a* might decrease until it would become insufficient to maintain the preselected clearance 58*a* between the sealing ring 26*a* and chamfer 56*a* of the valve body 22*a*. In accordance with one embodiment, the relationship between the size of the cross sectional area along the length of the valve cavity 46*a* and the preselected valve clearance 58*a* is determined empirically. However, check valves constructed as described above have operated satisfactorily with the cross sectional area of the valve cavity 34*a* about equal to or greater than that of the preselected clearance 58*a*. When the size of the cross sectional area of the length of the valve cavity is sized appropriately, the pressure chamber 48*a* can only starve if the compressor pump fails to maintain sufficient air pressure in the valve cavity 34*a* to produce sufficient force to remove contact between the sealing ring 26*a* and chamfer 56*a*.

Referring to FIG. 2B, the valve clearance 58*a* is sufficient for the pressure of air flowing there through to continuously remove air from the valve cavity 34*a* through the outlet end 42a of the valve body 22a. This continues to occur throughout the repeated cycles of the compression cylinder of the compressor pump. Since the valve cavity 34a is directly open, via the flutes 33a and pressure chamber 48a, to the valve clearance 58a, there is no substantial obstruction to prevent the continuous removal of air from the valve cavity 34a through the outlet end 42a of the valve body 22a to prevent substantial accumulation of back pressure in the valve cavity 34a or upstream of the check valve 20a.

As the compressor pump continues to pressurize the valve cavity 34a to maintain an air pressure level that is sufficient to maintain a cracking force against the sealing and actuation rings 26a and 28a, the valve clearance 58a will continue to exist between the sealing ring 26a and valve body 22a. If movement of the sealing ring 26a in the downstream direction 46a to locations along the non-tapered section 52a that are away from the valve body 22a results in significant additional amounts of backpressure in the valve cavity 34a, the resulting smaller clearance between the sealing ring 26a and valve body 22a will still allow the pressure of air flowing through the clearance between the sealing ring 26a and valve body 22a to remove sufficient amounts of air from the valve cavity 34a to prevent substantial accumulation of back pressure. Referring to FIG. 2B, the pressure of air flowing through a valve clearance reduced in size from the preselected valve clearance 58a continues to be sufficient to continuously remove air from the valve cavity 34a to prevent substantial accumulation of back pressure whenever the compressor pump produces a clearance pressure.

The ability of the check valve 20a to operate without substantial accumulations of back pressure from the valve cavity 34a enables the valve 20a to be used to pass process flows of air from the inlet end 38a through the outlet end 42b of the valve body 22a without creating substantial back pressure. Process flows of air generally involve the movement of substantial volumes of air such as those used to effect the operation of mechanical devices and fluid-driven processes. The ability of the check valve 20a to admit large amounts of air through the preselected clearance 58a between the valve body 22a and sealing ring 26a enables the check valve 20a to perform this function.

Figure 4:
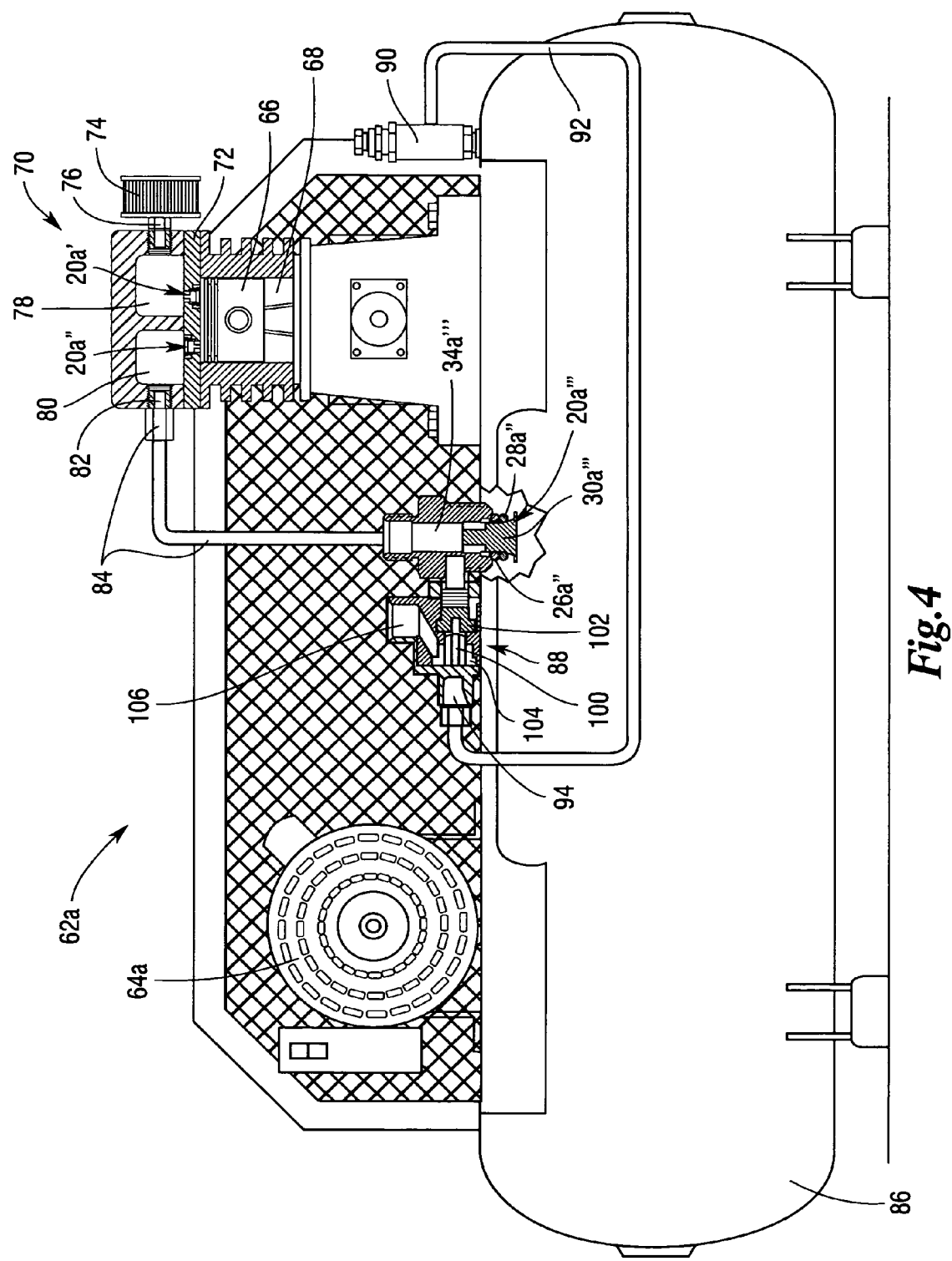
FIG. 4 is a side partial cross sectional view of an air compressor system incorporating check valves according to the invention.
Figure 5:
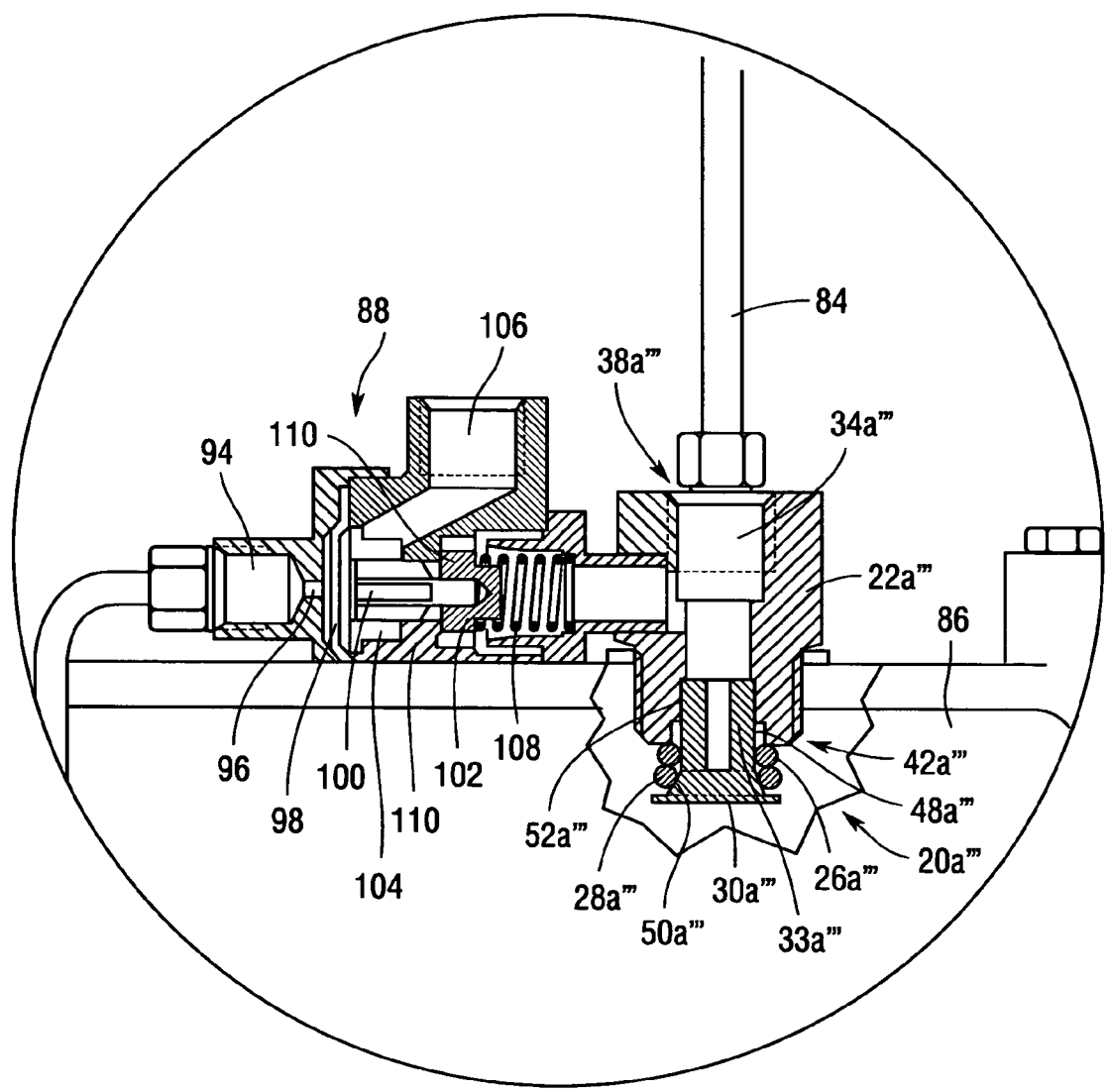
FIG. 5 is a magnified side partial cross sectional view of an unloader and check valve included in the air compressor system of FIG. 4.
Figure 6:
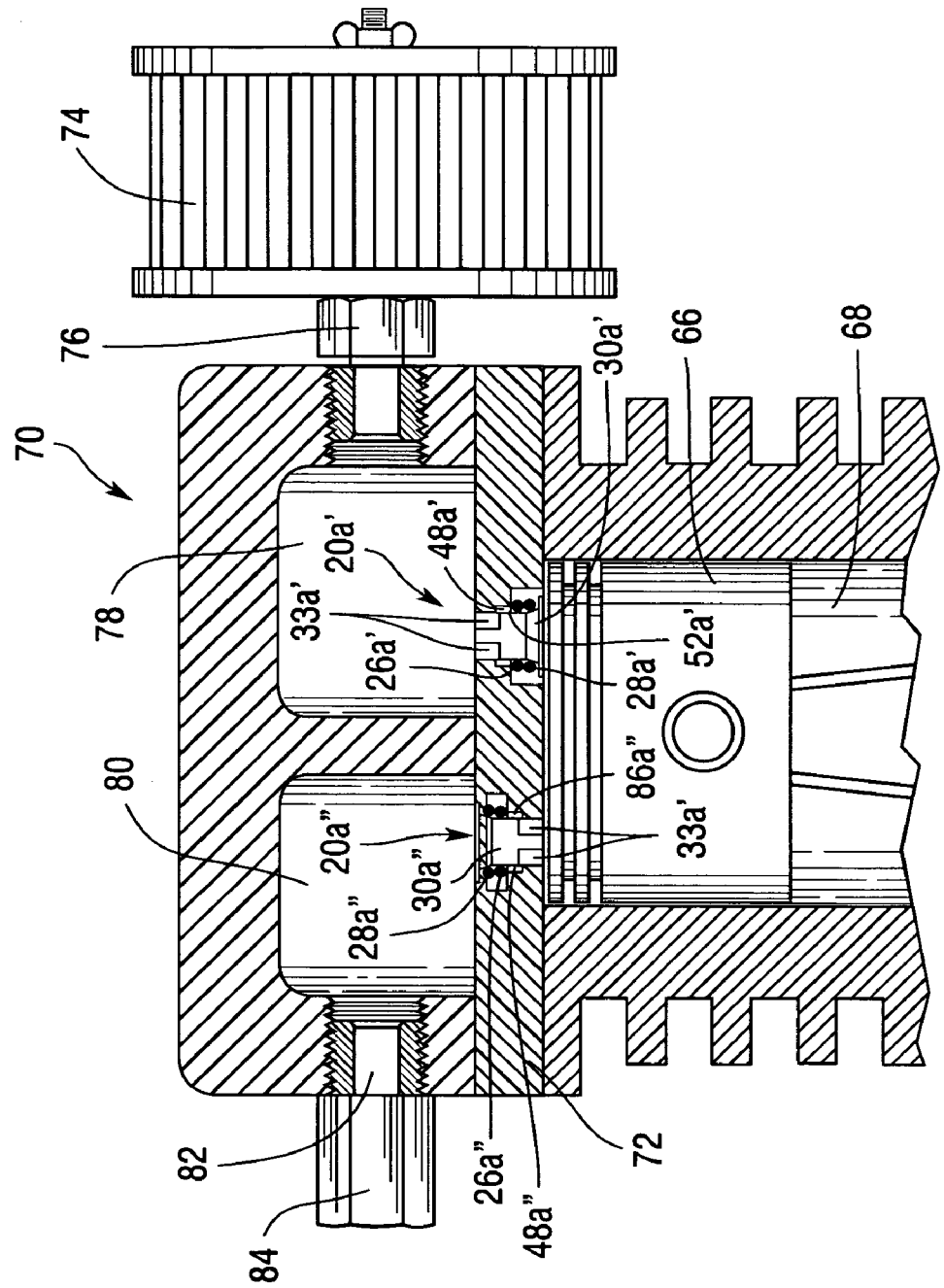
FIG. 6 is a magnified side partial cross sectional view of the compressor pump of the air compressor system of FIG. 4.

FIGS. 4-6 depict an air compressor system 62a incorporating check valves of the invention into various system components. The compressor system 62a includes an electric motor 64 configured to operate a piston 66 that is located within the compression cylinder 68 of a compressor pump 70. A valve plate 72 positioned above the compression cylinder 68 includes an inlet check valve 20a' and an outlet check valve 20a" of the invention and forms the valve body of both valves. Air enters the compressor pump 70 through an inlet filter 74 and inlet port 76 to enter into and create upstream atmospheric air pressure in a cylinder inlet chamber 78. When the piston 66 reciprocates within the compression cylinder 68, the piston 66 makes repeated intake strokes (moving in a downward direction in FIGS. 4 and 6) and compression strokes (moving in an upward direction in FIGS. 4 and 6).

As best understood with reference to FIG. 6, during each intake stroke, the piston 66 creates a vacuum in the compression cylinder 68. This causes a differential in air pressure between the cylinder inlet chamber 78 and compression cylinder 68 that is greater than the cracking pressure of the inlet check valve 20a'. As a result, air from the cylinder inlet chamber 78 flows through the flutes 33a' and pressure chamber 48a' to push the sealing ring 26a' along the non-tapered section 52a' of the plug 30a' which in turn creates a preselected clearance by removing sealing contact between the sealing ring 26a' and valve plate 72, allowing air to enter the compression cylinder 68 through the inlet check valve 20a'. During each intake stroke, air cannot enter through the outlet check valve 20a" from a cylinder outlet chamber 80 since air pressure contained in the cylinder outlet chamber 80 and the spring force of the actuation ring 28a" force the sealing ring 26a" into sealing contact with the valve plate 72, preventing the backflow of downstream air into the compression cylinder 68.

During each compression stroke, the piston 66 compresses air previously drawn into the compression cylinder 68 during the preceding intake stroke. This causes a differential in air pressure between the compression cylinder 68 and cylinder outlet chamber 80 that is greater than the cracking pressure of the outlet check valve 20a'. As a result, air from the compression cylinder 68 flows through the flutes 33a" and pressure chamber 48a" to force the sealing ring 26a" along the non-tapered section 52a" of the plug 30a" which in turn creates a preselected clearance by removing sealing contact between the sealing ring 26a" and valve plate 72, allowing air to enter the cylinder outlet chamber 80 through the outlet check valve 70a". During each compression stroke, air cannot enter through the inlet check valve 20a' from the cylinder inlet chamber 78 since the compressed air of the compression cylinder 68 and the spring force of the actuation ring 28a' force the sealing ring 26a' into sealing contact with the valve plate 72, preventing the flow of air into the compression cylinder 68 from the cylinder inlet chamber 78.

Repeated compression strokes by the piston 66 will lead to pressurization of the air contained within the cylinder outlet chamber 80 and, via the outlet port 82, the discharge tube 84. Referring to FIG. 4, the discharge tube 84 leads to a reservoir check valve 20a''' of the invention which is connected to allow for the flow of compressed air into an air reservoir 86. As best understood by comparing FIG. 4 with the magnified view of the reservoir check valve 20a''' and an unloader valve 88 in FIG. 5, the discharge tube 84 connects to the inlet end 38a''' of the reservoir check valve 20a''' to allow compressed air from the compressor pump 70 to flow through the valve cavity 34a''' toward the outlet end 42a'''. When air pressure in the valve cavity 34a''' exceeds the air pressure within the air reservoir 86 by a pressure differential that results in a force exceeding the cracking force of the check valve 20a''', the sealing ring 26a''' moves along the non-tapered section 52a''' of the plug 30a''' against the bias of the actuation ring 28a''' to remove the sealing ring 26a''' from sealing contact with the valve body 22a''' and creates a preselected clearance there between. This allows air to flow from the valve cavity 34a''' through the flutes 33a''' and pressure chamber 48a''' and past the sealing ring 26a''' into the air reservoir 86.

Referring to FIG. 4, a pilot valve 90 is mounted on the air reservoir 86 and is responsive the level of air pressure that is present within the air reservoir 86. A pilot valve tube 92 extends from the pilot valve 90 to the unloader valve 88 and allows the pilot valve 90 to transmit a pneumatic pressure signal to the unloader valve 88 which the unloader valve 88 receives from the pilot valve tube 92 through a signal chamber 94.

Referring to FIGS. 4 and 5, consider a situation in which the compressor pump 20 continues to pressurize the air reservoir 86 until the air pressure within the reservoir 86 reaches a preselected maximum level. The pilot valve 90, being responsive to the level of air pressure within the air reservoir 86, detects that the level of air pressure present in the reservoir 86 is at the preselected maximum level and responds by transmitting a pneumatic signal through the pilot valve tube 92. The pneumatic signal is received by the signal chamber 94 of the unloader valve 88, resulting in an increase in the amount of pneumatic pressure present within the signal chamber 94. The increased pressure in the signal chamber 94 results in pneumatic pressure being exerted through a signal aperture 96 to push against a sealing diaphragm 98. The sealing diaphragm 98 in turn pushes against an actuating stem 100 connected to an unloader piston 102 located in an unloader chamber 104.

The unloader valve 88 connects to the check valve 20a''' to link the unloader chamber 104 to the valve cavity 34a''' of the check valve 20a'''. The unloader chamber 104 opens to the valve cavity 34a''' at a location that is upstream of the sealing ring 26a''', and extends to a vent 106 that is open to atmosphere. The unloader piston 102 is biased with an unloader spring 108 to a sealing position (shown in FIG. 5) that seals the unloader piston 102 against an unloader seat 110, preventing the flow of air from the valve cavity 34a''' of the check valve 20a''' through the unloader chamber 104 and vent 106 to atmosphere.

When the sealing diaphragm 98 pushes against the actuating stem 100, the stem 100 pushes the unloader piston 102 against the bias of the unloader spring 108, removing the sealing contact of the unloader piston 102 against the unloader seat 110. Therefore, in response to the maximum reservoir air pressure detected by the pilot valve 90, the unseated unloader piston 102 allows air to flow from the valve cavity 34a''' of the check valve 20a''' through the unloader valve 88 to atmosphere. This also causes the pressure differential between the valve cavity 34a''' and air reservoir 86 to drop to such an extent that air pressure in the valve cavity 34a''' can no longer exert a cracking force against the sealing ring 26a''' and actuation ring 26a''' and maintain the sealing ring 26a''' at a location along the non-tapered section 52a''' of the plug 30a''' that is away from the valve body 22a''', allowing the check valve 20a''' to close under the spring force of the actuation ring 28a'''.

The unloader valve 88 continues to allow compressed air from the discharge tube 84 and valve cavity 34a''' to exit to atmosphere until the pilot valve 90 detects that the air pressure contained within the air reservoir 86 has fallen below a preselected minimum level. When such a fall in the level of reservoir air pressure occurs, the pilot valve 90 removes the pneumatic air signal from the pilot valve tube 92, allowing the unloader piston 102 to move under the biasing force of the unloader spring 108 back into sealing contact with the unloader seat 110 and prevent the flow of air through the unloader valve 88 to atmosphere. This in turn allows air pressure in the valve cavity 34a''' of the check valve 20a''' to again rise to a cracking pressure to create a cracking force to move the sealing ring 26a''' from contact with the valve body 22a''' and allow for the further pressurization of the air reservoir 86 until the air pressure in the reservoir 86 again reaches the preselected maximum level. This configuration allows the compressor pump 70 to run continuously without exceeding the preselected maximum air pressure in the air reservoir 86.

Figure 3A:
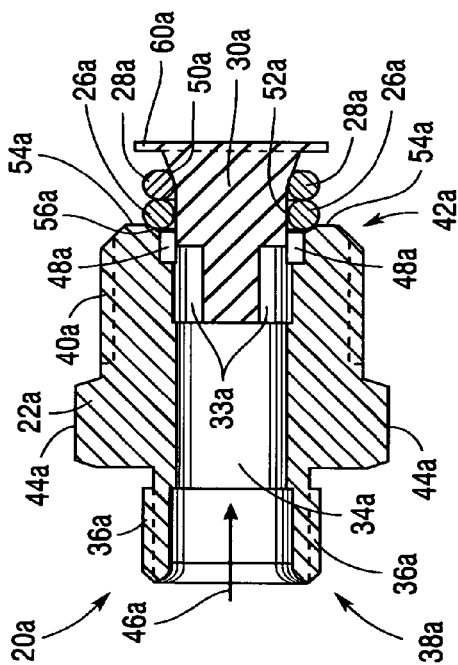
FIG. 3A is a side cross sectional view of a check valve of the invention depicting an elastomeric actuation ring and sealing ring in a normal position.

Although the invention has been shown and described with respect to an embodiment in which a sealing ring contacts a chamfer or flattened surface of the valve body, it will be appreciated that various types of sealing contact surfaces can be incorporated into a valve body within the scope of the invention, some of which are described below. By way of example, FIG. 3A is a side cross sectional view of a check valve 20b in which the valve body 22b has a face 54b at the outlet end 42b that intersects the pressure chamber 48b at an edge 112b. The sealing ring 26b is reciprocally mounted around the non-tapered section 52b and biased with the actuation ring 28b to a normal position in which the sealing ring 26b makes sealing contact with the edge 112b to prevent the flow of fluid from the pressure chamber 48b through the outlet end 42b of the valve body 22b.

When the sealing ring 26b is in this normal position, a portion of the curved outside surface of the sealing ring 26b remains exposed to the pressure chamber 48b. The edge 112b forms a relatively small point for contact with the sealing ring 26b, increasing the remaining curved outside surface area of the sealing ring 26b that remains exposed to the pressure chamber 48b. By increasing the outside surface area of the sealing ring 26b that is exposed to the pressure chamber 48b, the edge 112b increases the amount of sealing ring surface area that is exposed to fluid pressure present in the valve cavity 34b, reducing the cracking pressure required to initially move the sealing ring 26b away from the edge 112b to create a preselected clearance there between and open the check valve 20b. By forming a relatively small point of contact with the sealing ring 26b, the edge 112b also reduces the distance that the sealing ring 26b must move in the downstream direction 46b along the tapered section 50b to lose sealing contact with the edge 112b and allow for the flow of fluid between the pressure chamber 48b and outlet end 42b, further reducing the cracking pressure of the check valve 20b.

Figure 7B:
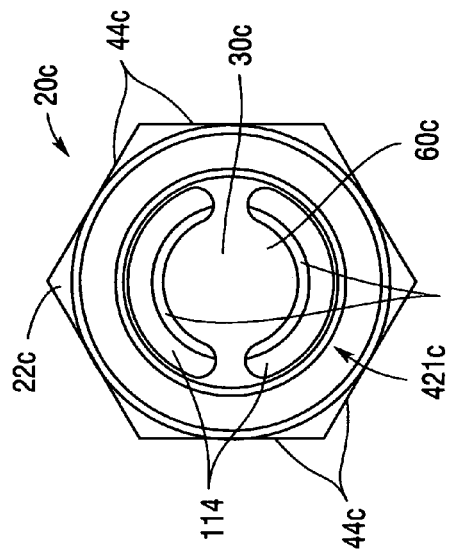
FIG. 7B is a front view of the check valve of FIG. 7A.
Figure 7A:
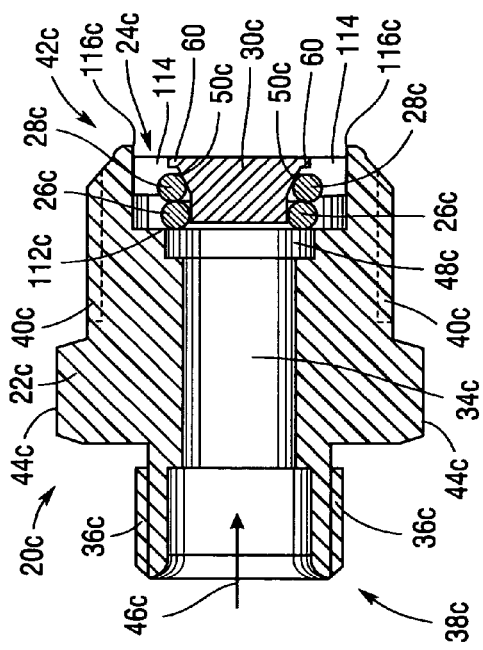
FIG. 7A is a side cross sectional view of a check valve of the invention depicting an elastomeric actuation ring and sealing ring in a normal position.

It will be further appreciated that some embodiments may allow variations in the configurations of the plug and pressure chamber. FIGS. 7A and 7B depict side cross sectional and front views of a check valve 20c having a plug 30c that is suspended in position at the outlet end 42c of the valve body 22c with a restrictor disk 60c. The plug 30c is shaftless, with the valve assembly 24c extending only slightly into the valve cavity 34c at the outlet end 42c of the check valve 20c. This configuration eliminates the need for flutes for the passage of fluid in the valve cavity 34c in the downstream direction 46c from the inlet end 38c to the pressure chamber 48c. Fluid passages 114 allow fluid to pass through the valve assembly 24c and out the outlet end 42c when the sealing ring 26c moves in the downstream direction 46c away from the valve body 22c to create a preselected clearance and open the check valve 20c. The edge 112c of the pressure chamber 48c is located upstream of the downstream terminus 116c of the valve cavity 34c.

Figure 8B:
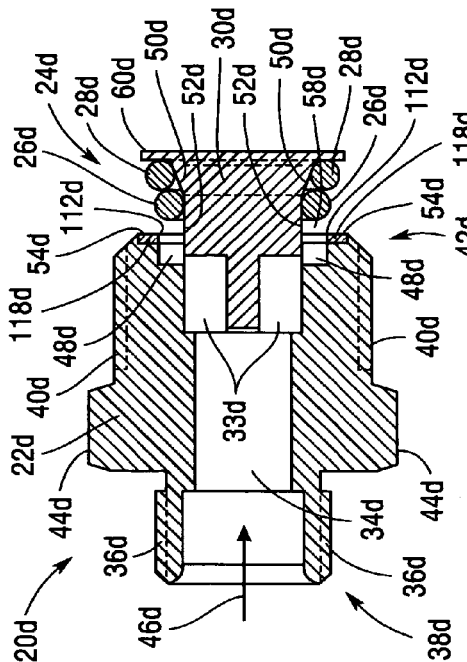
FIG. 8B is a side cross sectional view of the check valve of FIG. 8A depicting a preselected clearance that is a valve clearance between the sealing ring and the valve body.
Figure 8A:
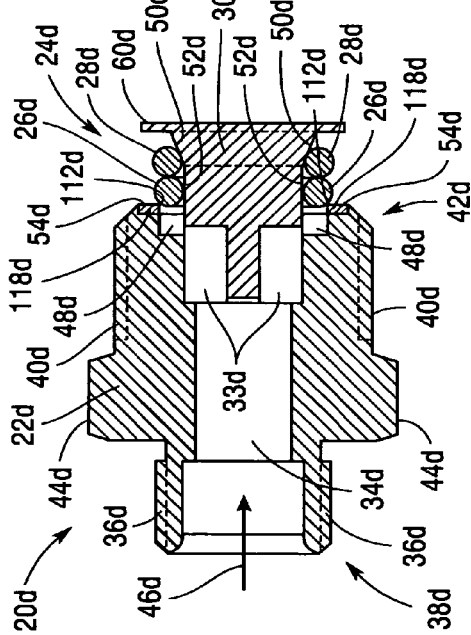
FIG. 8A is a side cross sectional view of a check valve of the invention depicting an elastomeric actuation ring and sealing ring in a normal position.

In some contemplated embodiments of the invention, in which the elastomeric seal seals against an edge of the pressure chamber in the normal position, the edge may vary in construction, placement, and/or orientation with respect to the valve body or other check valve components. FIGS. 8A and 8B depict side cross sectional views of a check valve 20d in which the valve body 22d includes a washer insert 118d that is compression fit into the valve cavity 34d at the outlet end 42d to become part of the valve body 22d. An exposed, downstream surface of the washer insert 118d forms the face 54d of the valve body 22d. The washer insert 118d also forms part of the inside surface of the valve cavity 34d in the pressure chamber 48d. Referring to FIG. 8B, when the check valve 20d is fully open, the preselected valve clearance 58d is determined by the clearance that exists between the sealing ring 26d, as it is positioned against the restrictor 60d, and the edge 112d of the valve body 22c that is created by the washer insert 118d. In addition to compression fitting, similar washer inserts can also be connected to the rest of the valve body with threads, adhesives, or other forms of attachment.

Figure 9A:
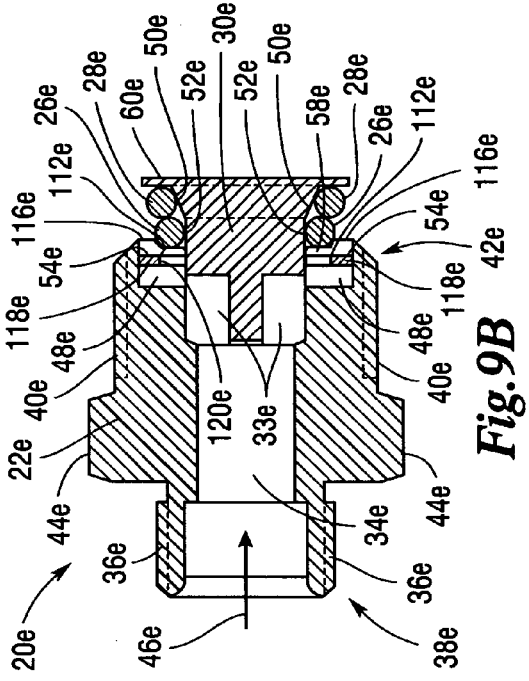
FIG. 9A is a side cross sectional view of a check valve of the invention depicting an elastomeric actuation ring and sealing ring in a normal position.
Figure 9B:
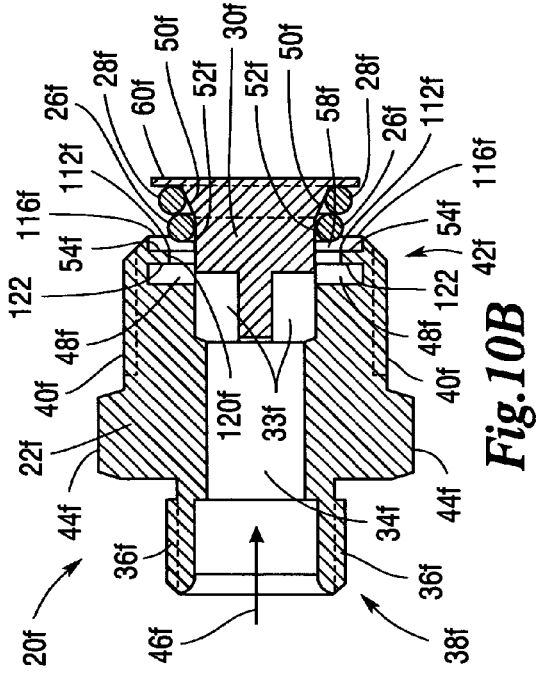
FIG. 9B is a side cross sectional view of the check valve of FIG. 9A depicting a preselected clearance that is a valve clearance between the sealing ring and the valve body.

Such washer inserts can also be positioned within the valve cavity of a check valve to form a flange or similar structure that is part of the valve body extending inwardly into the valve cavity. FIGS. 9A and 9B depict side cross sectional views of such a check valve 20e having a washer insert 118e that is compression fit to a position that is within the valve cavity 34e near the outlet end 42e to become part of the valve body 22e.

Due to this positioning of the washer insert 118e, the face 54e of the valve 20e is formed by a downstream surface of the washer insert 118e and is located in a position that is upstream of the downstream terminus 116e of the valve cavity 34e. The washer insert 118e also forms an inside surface 120e of the valve cavity 34e that intersects the face 54e to create an edge 112e against which the sealing ring 26e can seal when in the normal position (as shown in FIG. 9A). The pressure chamber 48e is located in a position that is immediately upstream of the washer insert 118e.

Figure 10A:
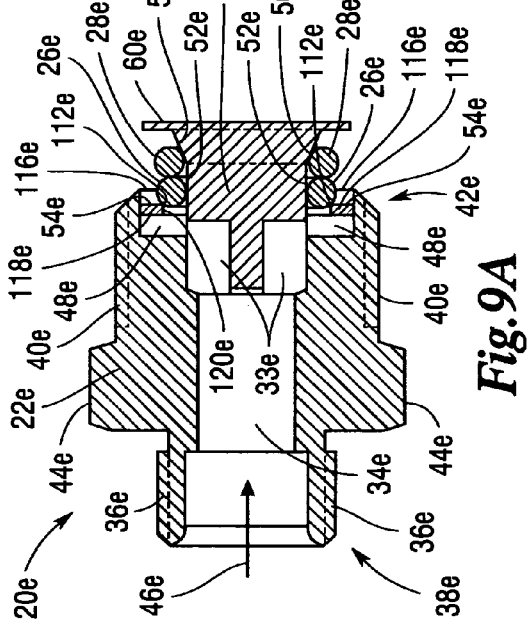
FIG. 10A is a side cross sectional view of a check valve of the invention depicting an elastomeric actuation ring and sealing ring in a normal position.
Figure 10B:
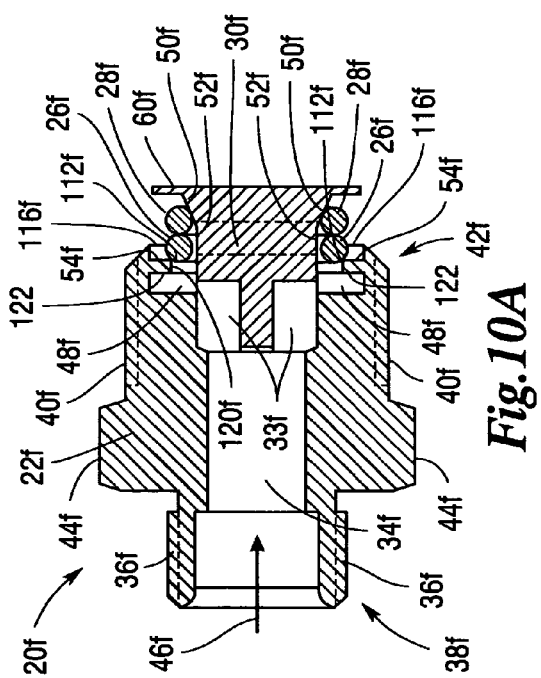
FIG. 10B is a side cross sectional view of the check valve of FIG. 10A depicting a preselected clearance that is a valve clearance between the sealing ring and the valve body.

Rather than including a separate washer insert or other assembly, the valve body can also include a flange extension or other inwardly extending formation that is formed directly from the valve body material itself. FIGS. 10A and 10B depict a check valve 20f having a flange extension 122 that extends inwardly into the valve cavity 34f from the valve body 22f. The flange extension 122 is machined, cast, or otherwise formed from the material of the valve body 22f and is located near the outlet end 42f. Due to this positioning of the flange extension 122, the face 54f of the valve 20f is formed by a downstream surface of the flange extension 122 and is located in a position that is upstream of the downstream terminus 116f of the valve cavity 34f. The flange extension 122 also forms an inside surface 120 of the valve cavity 34f that intersects the face 54f to create an edge 112f against which the sealing ring 26f can seal when in the normal position (as shown in FIG. 10A). The pressure chamber 48f is located in a position that is immediately upstream of the flange extension 126.

Some contemplated embodiments may also include tapered sections divided into segments having different incident angles. For example, FIGS. 11A-C depict a check valve outlet end 42g in which the valve assembly 24g is constructed around a plug 36g having a tapered section 50g divided into a first tapered segment 128g and an adjacent second tapered segment 130g. The included angle of the second tapered segment 130g is shallower than the included angle of the first tapered segment 128g. However, the diameter of the second tapered segment 130g is greater than the diameter of the first tapered segment 128g. This difference between the included angles and diameters of the first and second tapered segments 128g and 130g enables the valve assembly 24g to allow for an increased fluid flow capacity during operation.

Consider the valve assembly 24g prior to operation when the sealing ring 26g and actuation ring 28g are in the normal positions as depicted in FIG. 11A. The sealing ring 26g remains in contact with the edge 112g at the face 54g to close the valve assembly 24g and prevents fluid flow through the outlet end 42g. At the normal position, the actuation ring 28g contacts the first tapered segment 128g but not the second tapered segment 130g of the plug 30g. The sealing and actuation rings 26g and 28g remain in their normal positions until a cracking pressure is introduced in the pressure chamber 48g. To initially open the valve assembly 24g, the cracking pressure must be sufficiently large to exert a sufficient amount of force against the sealing ring 26g, acting on the limited surface areas of the sealing ring 26g exposed to the pressure chamber 48g, to move the sealing ring 26g away from the valve face 54g and against the frictional forces encountered by the actuation ring 28g against the steeper included angle of the first tapered segment 128g. A sufficient amount of total force exerted against the sealing ring 26g and actuation ring 28g must also continue to be present to move the actuation ring 28g against the included angle of the first tapered segment 128g until the sealing and actuation rings 26g and 28g move to the positions shown in FIG. 11B. However, since the diameter of the first tapered segment 128g is less than the diameter of the second tapered segment 130g, inward radial forces exerted by the actuation ring 28g are relatively low. As the valve assembly 24g opens, more surface area of the sealing ring 26g becomes exposed to the fluid pressure from the pressure chamber 48g, increasing the total force exerted against the sealing ring 26g and against the biasing force of the actuation ring 28g.

Referring now to FIG. 11B, as the sealing ring 26g continues to move along the non-tapered portion 52g in the downstream direction 46g, the actuation ring 28g moves to the second tapered segment 130g. As the actuation ring 28g moves in the downstream direction 46g along the second tapered segment 130g, the increased diameter of the second tapered segment 130g results in increased inward radial forces being exerted by the actuation ring 28g as it increasingly stretches. Frictional forces between the actuation ring 28g and second tapered segment 130g also increase as the actuation ring 28g stretches further. Thus, as the diameter of the second tapered segment 130g increases, it becomes increasingly important to keep additional stretching of the sealing ring 26g to a minimum.

The shallower included angle of the second tapered segment 130g allows for a reduction in such stretching. As the actuation ring 28g moves along the second tapered segment 130g to allow the sealing ring 30g to move along the non-tapered section 52g toward the fully open preselected valve position depicted in FIG. 11C, the increased inward radial forces exerted by the actuation ring 28g are less than they would be if the included angle of second tapered segment 130g were as steep as the first tapered segment 128g. Thus, the overall amount of force required to move the actuation ring 28g to points along the second tapered segment 130g is reduced. For many operating conditions, and particularly those conditions in which there is sufficient pressure and force to move the actuation ring 28g to the second tapered segment 130g, this tends to allow for the displacement of the sealing ring 26g a greater distance from the valve face 54g for a given pressure, allowing a larger volume of fluid to flow through the valve assembly 24g at the given pressure.

It will be appreciated that any number of tapered sections or tapered segments can be included within the contemplated scope of the invention, and it is further contemplated that different tapered segments can share or have different included angles. For example, FIGS. 12A-C depict a check valve outlet end 42h of the invention in which the valve assembly 24h includes a tapered section 50h having a third tapered segment 132h that has an included angle that is shallower than the included angles of either the first tapered segment 128h or second tapered segment 130h. Due to the shallower included angle of the second tapered segment 132h, after the actuation ring 28h moves along the first tapered segment 128h, as depicted in FIG. 12A, less force is required to move the actuation ring 28h along points of the second tapered segment 130h, as depicted in FIG. 12B, than would be required if the second tapered segment 132h had the included angle of the first tapered segment 128h. Due to the even shallower included angle of the third tapered segment 132h, after the actuation ring 28h moves along the second tapered segment 130h, less force is required to move the actuation ring 28h along points of the third tapered segment 132h than would be required if the third tapered segment 132h had the included angles of either the first tapered segment 128h or second tapered segment 130h.

It will be further appreciated that tapered sections that are curved or that are otherwise shaped to have a non-constant incident angle can also be incorporated within the contemplated scope of the invention. For example, FIGS. 13A-C depict a check valve outlet end 42i of the invention that includes a valve assembly 24i having a curved tapered section 50i with a diameter that becomes increasingly wider but which has a curved slope that is increasingly shallow in downstream direction 46i. The curved shape of the cross sectional slope of the tapered section 50i can allow for increased flow capacity by the valve assembly 24i under some operating conditions.

Consider the valve assembly 24i prior to operation when the sealing ring 26i and actuation ring 28i are in the normal positions as depicted in FIG. 13A. The sealing ring 26i remains in contact with the edge 112i at the face 54i to close the valve assembly 24i and to prevent fluid flow through the outlet end 42i. At this position, the actuation ring 28i contacts the curved tapered section 50i at a position where the tapered section 50i has a relatively steep slope. The sealing and actuation rings 26i and 28i remain in the normal positions until a cracking pressure is introduced in the pressure chamber 48i. To initially open the valve assembly 24i, the cracking pressure must be sufficiently large to exert a sufficient amount of force against the sealing ring 26i, acting on the limited surface areas of the sealing ring 26i exposed to the pressure chamber 48i, to move the sealing ring 26i away from the valve face 54i and against the frictional forces of the actuation ring 28i encountered as the sealing ring 26i moves along the non-tapered section 52i and the actuation ring 28i moves along the tapered section 50i. However, since the diameter of the tapered section 50i is smaller near the non-tapered section 52i, inward radial forces exerted by the actuation ring 28i are relatively low. As the valve assembly 24i opens, more surface area of the sealing ring 26i and actuation ring 28i becomes exposed to the fluid pressure from the pressure chamber 48i, increasing the total force exerted against the sealing ring 26i and actuation ring 28i.

Referring now to FIG. 13B, once the sealing ring 26i moves away from the edge 112i, the actuation ring 28i moves along the tapered section 50i, with the increased diameter of the tapered section 50i causing the actuation ring 28i to stretch, resulting in increased inward radial forces being exerted by the actuation ring 28i. Frictional forces between the actuation ring 28i and tapered section 50i also increase as the actuation ring 28i stretches further. Thus, as the actuation ring 28i moves further along the tapered section 50i and away from the valve face 54i, it becomes increasingly important to keep additional stretching of the actuation ring 28i to a minimum.

The curved cross sectional shape of the tapered section 50i, in which the slope of the tapered section 50i becomes increasingly shallower in the downstream direction 46i, allows for a reduction in such stretching. As the actuation ring 28i moves along the tapered section 50i to allow the valve assembly 24i to assume the fully open preselected valve position depicted in FIG. 13C, the increased inward radial forces exerted by the actuation ring 28i are less than they would be if the slope of the tapered section 50i was the same near the restrictor 60i as it is near the non-tapered portion 52i. Thus, the overall amount of force required to move the actuation ring 28i to points along the tapered section 50i is reduced. This tends to allow the sealing ring 26i to be displaced a greater distance from the valve face 54i for a given pressure, allowing a larger volume of fluid to flow through the valve assembly 24i at the given pressure.

Although the invention has been shown and described as having sealing and actuation rings that are cross sectional in shape, it will be appreciated that in some embodiments, other cross sectional shapes can be incorporated within the anticipated scope of the invention. For example, FIGS. 14A-C depict a check valve outlet end 42j of the invention that includes a valve assembly 24j having a sealing ring 26j that is rectangular in its cross sectional shape. As best understood with reference to FIG. 14A, the rectangular cross sectional shape of the sealing ring 26j allows for increased surface contact between the sealing ring 26j and the flat surface of the face 54j when the valve assembly 24j is closed and the sealing ring 26j and actuation ring 28j are in the normal positions. This can serve to enhance sealing of the valve assembly, depending on the selected material of the sealing ring 26j, for some applications. It will be further appreciated that other cross sectional ring shapes are possible and that such variations in cross sectional ring shapes can also be made to actuation rings.

Although the invention has been shown and described as being incorporated into check valves of the invention having sufficient cross sectional clearances to allow for the evacuation of substantial accumulations of backpressure, it will be appreciated that the invention can also be incorporated into check valves where the cross sectional clearance of the valve is not sufficient to continuously remove fluid from the valve cavity so as to prevent a substantial accumulation of back pressure produced by the fluid compressor upstream of the check valve. Some embodiments may incorporate configurations in which such accumulations of gas or liquid fluid backpressure or valve starving is either intended or desired due to the specific application of the valve.

Figure 15B:
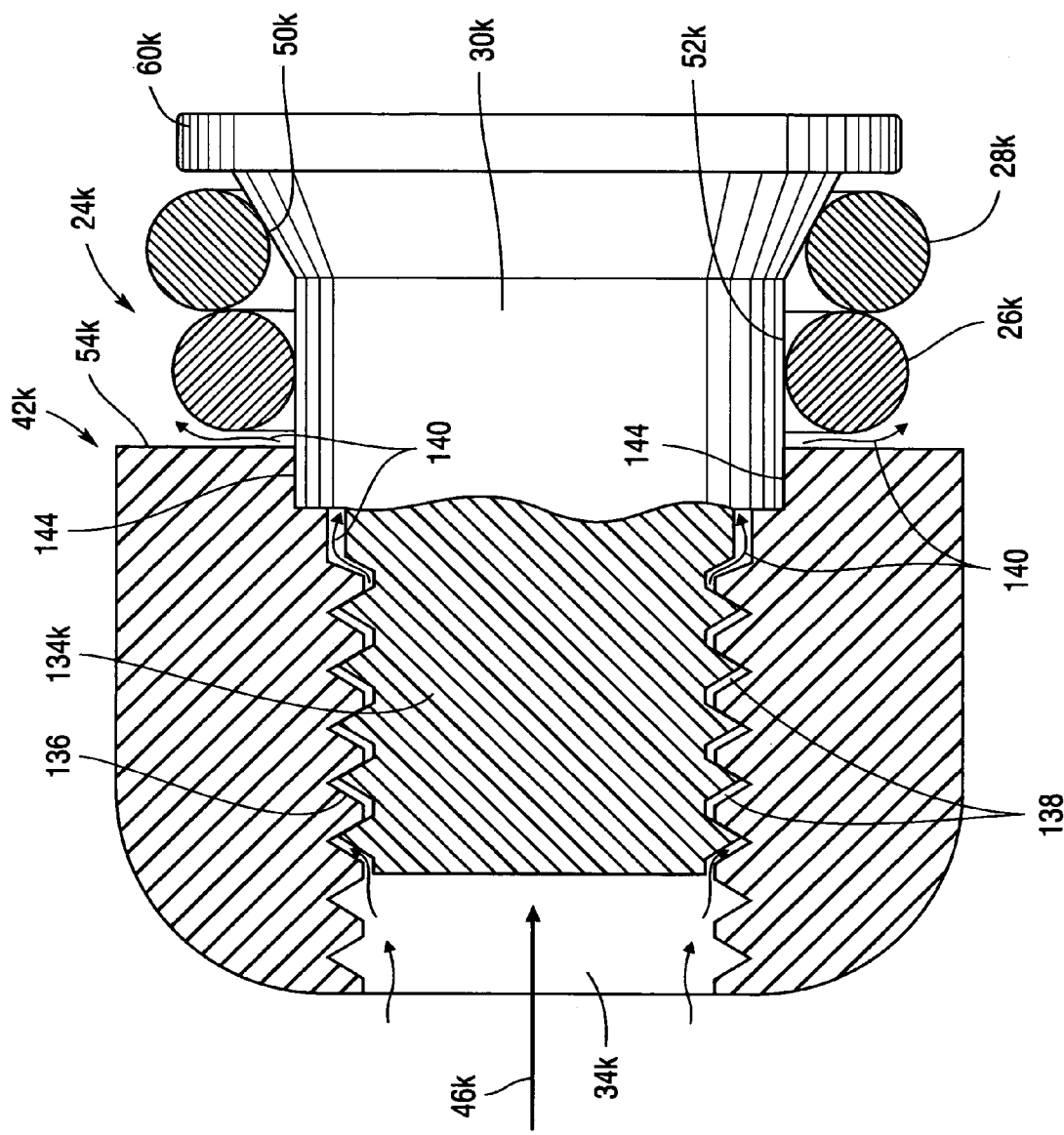
FIG. 15B is a side cross sectional view of the check valve of FIG. 15A depicting a preselected clearance between the sealing ring and the valve body.
Figure 15C:
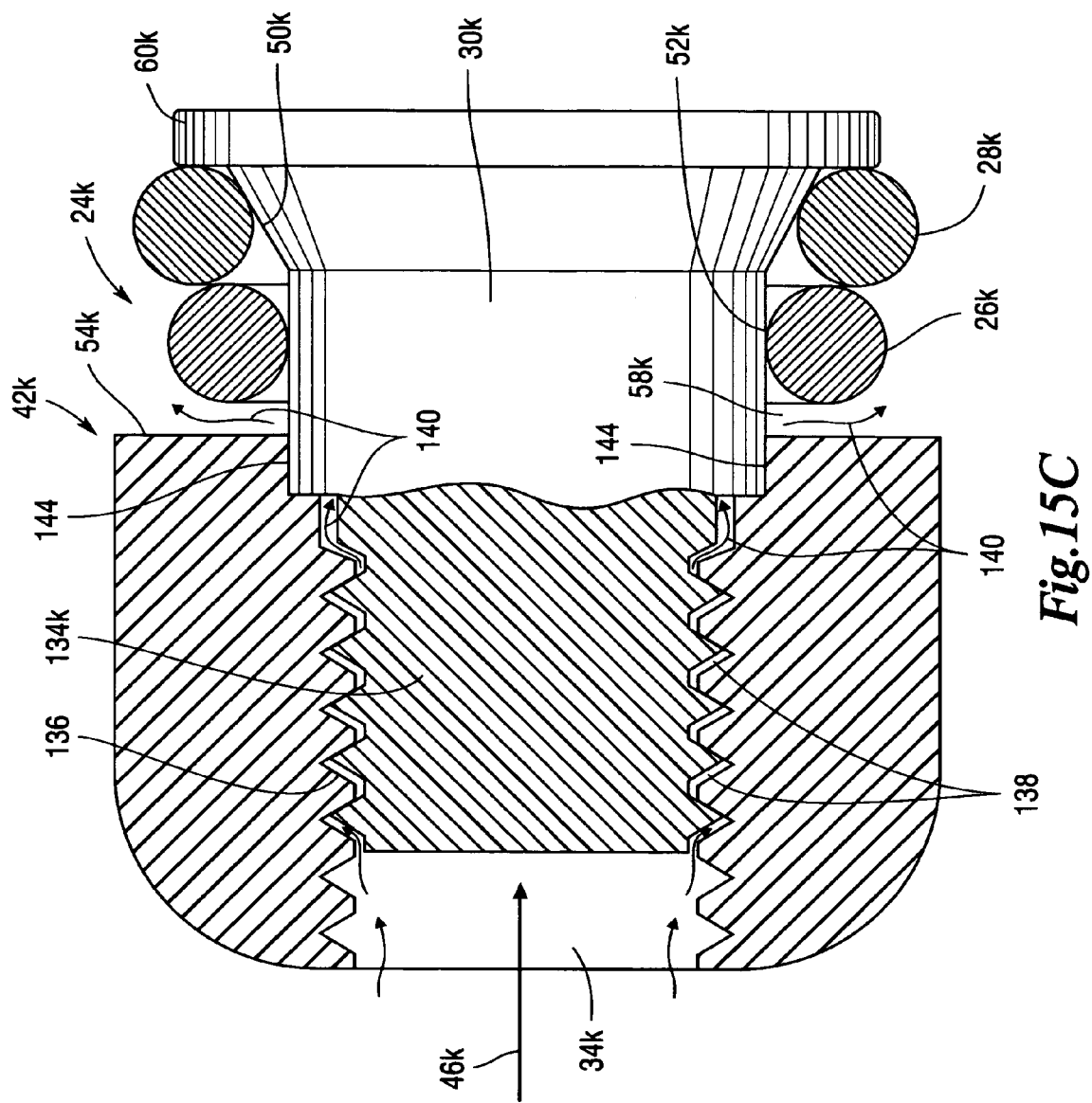
FIG. 15C is a side cross sectional view of the check valve of FIG. 15A depicting a preselected clearance that is a valve clearance between the sealing ring and the valve body.

FIGS. 15A-C are cross sectional views of the outlet end 42k of a check valve of the invention having a threaded shank member 134k that engages the inside threads 136 of the valve cavity 34k. The shank member 134k includes a tapered section 50k on which the sealing ring 26k and actuation ring 28k are reciprocally mounted. The sealing ring 26k and actuation ring 28k are biased to position the sealing ring 26k against the face 54k and prevent the flow of fluid through the outlet end 42k, as shown in FIG. 15A.

As best understood by comparing FIG. 15A with 15B, the fitting between the shank member 134k and inside threads 136 is sufficiently loose that a leakage clearance 138 exists between the mating threads of the shank member 134k and inside threads 136, permitting fluid 140 to flow through the leakage clearance 138 from upstream of the shank member 134k, around an indentation fitting 144 of the non-tapered section 52k, and toward the sealing ring 26k. The leakage clearance 138 is small in comparison with the amount of fluid that would typically be fed by the compressor pump from upstream of the shank member 134k.

As a result, the leakage clearance 138 does not generally allow for the passage of a sufficient amount of fluid from upstream of the shank member 134k to prevent a substantial accumulation of upstream backpressure unless a check valve of an impractically large size is used. Under typical operating conditions, the compressor may therefore create a substantial backpressure in the valve cavity 34k before a sufficient amount of flowing fluid 140 is capable of creating a cracking force to move the sealing and actuation rings 26k and 28k to the partially open positions depicted in FIG. 15B. Additional backpressure may be required to move the sealing and actuation rings 26k and 28k to the fully open positions to create a valve clearance 58k, as depicted in FIG. 15C. However, such a configuration of the outlet end 42k may be used where the desired accommodated flow is less than a process flow, such as in smaller control flows of fluid for logic operations.

Figure 16B:
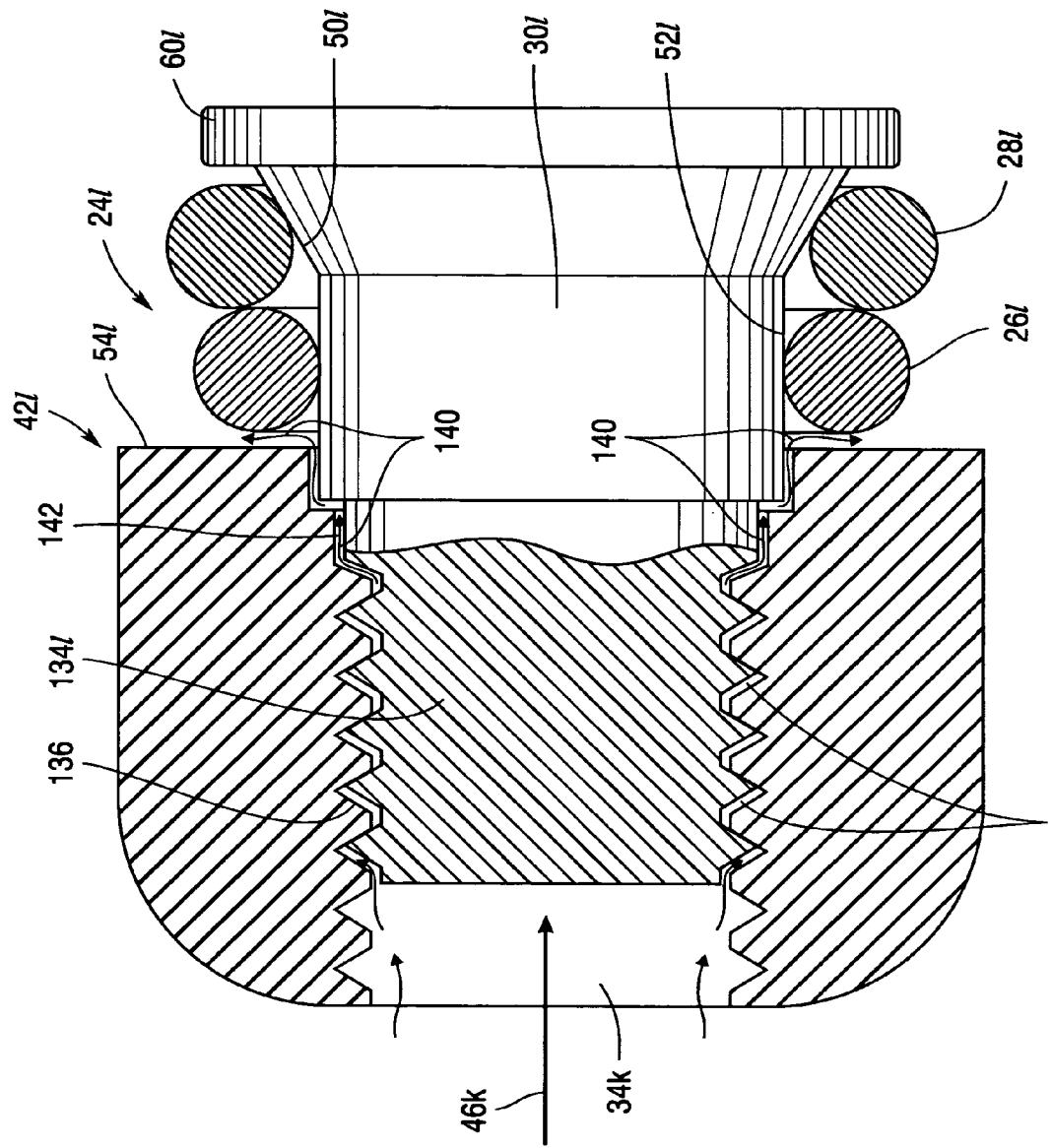
FIG. 16B is a side cross sectional view of the check valve of FIG. 16A depicting a preselected clearance between the sealing ring and the valve body.
Figure 16C:
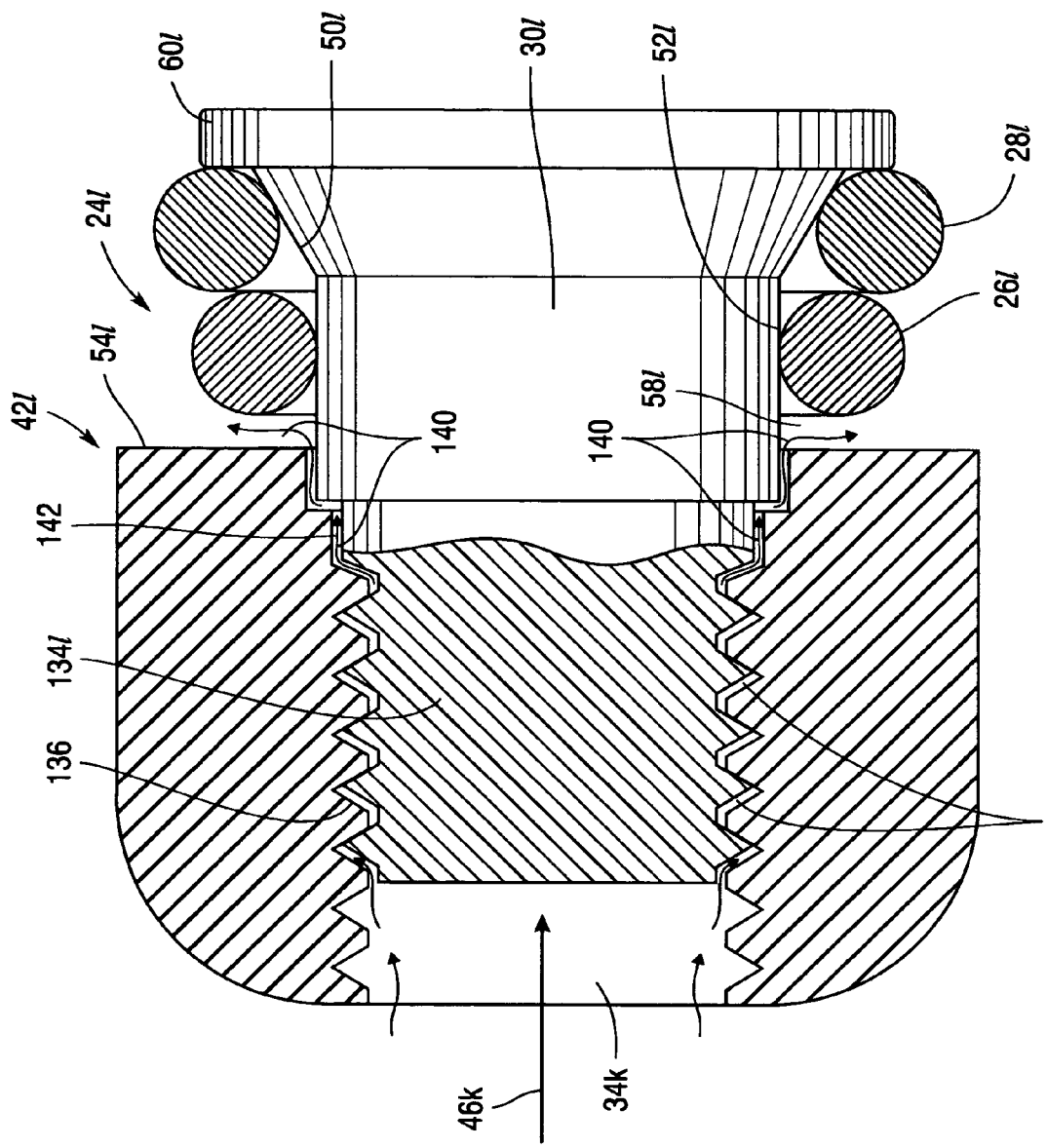
FIG. 16C is a side cross sectional view of the check valve of FIG. 16A depicting a preselected clearance that is a valve clearance between the sealing ring and the valve body.

FIGS. 16A-16C depict cross sectional views of the outlet end 42l of a check valve of the invention having a threaded shank member 134l that engages the inside threads 136 of the valve cavity 34k to provide a leakage clearance 138. As best understood by comparing FIGS. 16A and 16B, the threaded shank member 134l and non-tapered section 52l of the plug 30*l* are sized to create a shank clearance 142 with the valve cavity 34*l* to allow flowing fluid 140 to pass toward the sealing ring 26*l* while this allows fluid to pass from upstream of the threaded shank member 134*l* to the sealing ring more easily than through an indentation fitting, the shank clearance 142 would not normally create a sufficient cross sectional area to allow a substantial evacuation of backpressure from the valve cavity 34*l* during normal operation of the compressor pump. Thus, it is would be highly likely for a substantial accumulation of backpressure to exist in the valve cavity 34*l* by the time that flowing fluid 140 created sufficient force against the sealing ring 26*l* and actuation ring 28*l* to create a valve clearance 58*l* between the sealing ring 26*l* and face 54*l*. Thus, such a configuration of the outlet end 42*l* can be similarly limited to the accommodation of flows less than a process flow of fluid, such as control flows of fluid for logic operations.

FIGS. 17A and B depict a check valve 20*m* of the invention having valve cavity 34*m* opening to an fluid hole 145 that leads to a non-tapered section 52*m* via a slant passage 150. The fluid hole 145 and slant passage 150 have cross sectional areas that are control clearances that are much smaller than the valve cavity 34*m*. Due to the relatively small size of the control clearances, neither the fluid hole 145 nor slant passage 150 are capable of accommodating a process flow of fluid during normal operation. Thus, the valve 20*m* cannot be used to continuously remove backpressure from the valve cavity 34*m* during normal operation of the compressor pump, but may be used for accommodating smaller fluid flows such as logic control flows.

As best understood with a comparison of FIGS. 17A and B, the slant passage 150 opens to only a single opening point 152 along the circumference of the non-tapered section 52*m*. It is only generally at the opening point 152 that upstream fluid pressure contacts and exerts fluid pressure against the sealing ring 26*m* and against the biasing force of the actuation ring 28*m*. The position of the sealing ring 26*m* mounted around the non-tapered section 52*m* is generally represented with dotted lines 26*m*', and the position of the actuation ring 28*m* mounted around the tapered section 50*m* is generally represented with dotted lines 28*m*'.

When sufficient pressure is present within the fluid hole 145 and slant passage 150 to exert a cracking force against the sealing ring 26*m* and actuation ring 28*m*, only the general area of the sealing ring 26*m* near the opening point 152 receives the force of the fluid pressure, resulting in a slightly crooked positioning of the sealing ring 26*m* and actuation ring 28*m*, as shown by dotted lines 26*m*' and 28*m*', on the non-tapered and tapered sections 52*m* and 50*m*. Thus, when sufficient fluid pressure is present in the fluid hole 145 and slant passage 150 to create a valve clearance 58*m* near the opening point 152, there is normally insufficient fluid force to create such a clearance at other positions along the circumference of the non-tapered and tapered sections 52*m* and 50*m*, leaving a gap 154 between the actuation ring 28*m* and restrictor 60*m* at positions that are not in the general area of the opening point 152 even though the valve 20*m* is fully open.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed:

1. A check valve for use in a fluid system that includes a fluid pump for moving a fluid, said check valve comprising:

a valve body having an inlet end through which fluid enters said check valve and an outlet end through which fluid exits said check valve, and a valve cavity within said valve body extending between about said inlet end and about said outlet end;

a valve assembly located at a position with respect to said valve cavity which enables said valve assembly to control the flow of fluid through said valve cavity, said valve assembly including a plug having at least a tapered section and a non-tapered section, said tapered section having a cross section that increases in diameter in a direction that is downstream from said inlet end;

said valve assembly having a sealing ring that is mounted to reciprocate at least along said non-tapered section;

said valve assembly having an elastomeric actuation ring that is mounted to said tapered section, said tapered section biasing said actuation ring to a normal position where said actuation ring contacts and positions said sealing ring in contact with said valve body and said valve assembly to prevent fluid from flowing downstream from said inlet end and out said outlet end; and said valve assembly allowing fluid to flow downstream from said inlet and out said outlet end of said valve body when the fluid pump produces an amount of fluid pressure necessary to create a force against said sealing ring that is sufficient to cause said sealing ring to exert a force against said actuation ring and to cause said sealing ring to be located at a position away from said valve body to create a preselected clearance between said valve body and said sealing ring.

2. The check valve of claim 1 further comprising an edge at about said outlet end of said valve body, said sealing ring being biased to contact said valve body at said edge when said actuation ring is in the normal position.

3. The check valve of claim 1 further comprising an edge at about said outlet end of said valve body, said edge being formed from a flange extending inwardly in said valve cavity, said actuation ring being biased to position said sealing ring in contact with said valve body at said edge when said actuation ring is in the normal position.

4. The check valve of claim 1 further comprising an edge at about said outlet end of said valve body, said edge being formed from a flange that is a circular washer which is compression fit to be part of said valve body and which extends inwardly into said valve cavity, said actuation ring being biased to position said sealing ring in contact with said valve body at said edge when said actuation ring is in the normal position.

5. The check valve of claim 1, said plug further comprises a shaft that includes four separate fluid passages through which fluid can flow downstream from said inlet end of said valve body through said valve cavity to said outlet end.

6. The check valve of claim 1 further comprising a pressure chamber that is the portion of said valve cavity that is located upstream of and about adjacent said sealing ring.

7. The check valve of claim 1, said preselected clearance between said sealing ring and said outlet end is sufficiently large to allow a process flow of fluid from said inlet end through said outlet end of said valve body when the fluid pump produces a clearance pressure.

8. The check valve of claim 1, a leakage clearance existing within said check valve to allow for the passage of fluid from said inlet end through said outlet end when the fluid pump produces a fluid pressure.

9. The check valve of claim 1, said tapered section including a restrictor to restrict further movement of said actuation ring in a direction that is downstream and away from said inlet end of said valve body when said sealing ring is separated from said valve body by a preselected clearance there between.

10. The check valve of claim 1, said sealing ring including an outside surface area, said sealing ring seal being positioned to allow more of said outside surface area to be exposed to fluid pressure produced by the fluid pump when said actuation ring is not in the normal position and when said sealing ring is not in sealing contact with said valve body than when said actuation ring is in the normal position and when said sealing ring is in sealing contact with said valve body.

11. The check valve of claim 1, said valve body including an inside chamfer in said valve cavity, said valve cavity having a diameter at said chamfer that increases in size in a downstream direction, said sealing ring being biased to contact said valve body at said chamfer when said actuation ring is in the normal position.

12. The check valve of claim 1, said plug extending across the diameter of said valve cavity at about said outlet end of said valve body, said plug having at least a fluid passage to allow for fluid to pass therethrough.

13. The check valve of claim 1, said tapered section including at least a first tapered segment and at least a second tapered segment, said first tapered segment having an incident angle that is different from an incident angle of said second tapered segment.

14. The check valve of claim 1, said tapered section including at least a first tapered segment and at least a second tapered segment, said second tapered segment having an incident angle that is shallower than an incident angle of said first tapered segment.

15. The check valve of claim 1, said tapered section including at least a first tapered segment, at least a second tapered segment, and at least a third tapered segment, said first tapered segment having an incident angle that is different than an incident angle of said second tapered segment, and said second tapered segment having an incident angle that is different than said incident angle of said third tapered segment.

16. The check valve of claim 1, said tapered section including at least a first tapered segment, a second tapered segment, and a third tapered segment, said second tapered segment having an incident angle that is shallower than an incident angle of said first tapered segment, and said third tapered segment having an incident angle that is shallower than said incident angle of said second tapered segment.

17. The check valve of claim 1, said tapered section having a curved cross sectional shape.

18. The check valve of claim 1, said tapered section having a curved cross sectional shape at which the slope of said tapered section becomes increasingly shallower in a direction that is downstream of said inlet end and in which a diameter of said tapered section becomes increasingly wider in a direction that is downstream of said inlet end.

19. The check valve of claim 1, said actuation ring having a circular cross shape.

20. The check valve of claim 1, said sealing ring having a circular cross shape.

21. The check valve of claim 1, said sealing ring having a rectangular cross shape.

22. The check valve of claim 1, said sealing ring having a cross sectional shape that is different from a cross sectional shape of said actuation ring.

23. The check valve of claim 1, said actuation ring being constructed of a material selected from the group consisting of viton, nitrile rubber, silicone, Aflas, and EPDM.

24. The check valve of claim 1, said sealing ring being constructed of a material selected from the group consisting of viton, nitrile rubber, silicone, EPDM, Teflon, Rulon, Delrin, PVC, ABS, Stainless Steel, Brass, Aflas, and Aluminum.

25. The check valve of claim 1, the fluid pump being a liquid pump, said sealing ring and said actuation ring comprising materials capable of withstanding liquid fluids.

26. The check valve of claim 1, the fluid pump being a water pump, said sealing ring and said actuation ring comprising materials capable of withstanding water.

27. The check valve of claim 1, the fluid pump being an oil pump, said sealing ring and said actuation ring comprising materials capable of withstanding oil.

28. A check valve for use in a fluid system that includes a fluid pump for moving a fluid, said check valve comprising:
   a valve body having an inlet end through which fluid enters said check valve and an outlet end through which fluid exits said check valve, and a valve cavity within said valve body extending between about said inlet end and about said outlet end;
   a valve assembly located at a position with respect to said valve cavity which enables said valve assembly to control the flow of fluid through said valve cavity, said valve assembly including a plug having at least a tapered section and a non-tapered section, said tapered section having a cross section that increases in diameter in a direction that is downstream from said inlet end;
   said valve assembly having a sealing ring that is mounted to reciprocate at least along said non-tapered section;
   said valve assembly having an elastomeric actuation ring that is mounted to reciprocate at least along said tapered section, said tapered section biasing said actuation ring to a normal position where said actuation ring contacts and positions said sealing ring in contact with said valve body and said valve assembly to prevent fluid from flowing downstream from said inlet end and out said outlet end;
   said valve assembly allowing fluid to flow downstream from said inlet end and out said outlet end of said valve body when the fluid pump produces an amount of fluid pressure necessary to create a force against said sealing ring that is sufficient to cause said sealing ring to exert a force against said actuation ring and to cause said sealing ring to be located at a position away from said valve body to create a preselected clearance between said valve body and said sealing ring; and
   a portion of said valve cavity, between about said inlet end and about the location where said sealing ring contacts said valve body, having a minimum cross sectional area that allows the pressure of the fluid flowing through said preselected clearance to be sufficient to continuously remove fluid from said valve cavity to prevent substantial accumulation of back pressure produced by the fluid pump upstream of said valve when continuous operation of the fluid pump repeatedly causes said sealing ring to be located at a position away from said valve body and create said preselected clearance between said valve body and said sealing ring.

29. The check valve of claim 28 further comprising an edge at about said outlet end of said valve body, said sealing ring being biased to contact said valve body at said edge when said actuation ring is in the normal position.

30. The check valve of claim 28 further comprising an edge at about said outlet end of said valve body, said edge being formed from a flange extending inwardly in said valve cavity, said actuation ring being biased to position said sealing ring in contact with said valve body at said edge when said actuation ring is in the normal position.

31. The check valve of claim 28 further comprising an edge at about said outlet end of said valve body, said edge being formed from a flange that is a circular washer which is compression fit to be part of said valve body and which extends inwardly into said valve cavity, said actuation ring being biased to position said sealing ring in contact with said valve body at said edge when said actuation ring is in the normal position.

32. The check valve of claim 28, said plug further comprising a shaft that includes four separate fluid passages through which fluid can flow downstream from said inlet end of said valve body through said valve cavity to said outlet end.

33. The check valve of claim 28 further comprising a pressure chamber that is the portion of said valve cavity that is located upstream of and about adjacent said sealing ring.

34. The check valve of claim 28, said preselected clearance between said sealing ring and said outlet end being sufficiently large to allow a process flow of fluid from said inlet end through said outlet end of said valve body when the fluid pump produces a clearance pressure.

35. The check valve of claim 28, said tapered section including a restrictor to restrict further movement of said actuation ring in a direction that is downstream and away from said inlet end of said valve body when said sealing ring is separated from said valve body by a preselected clearance there between.

36. The check valve of claim 28, said sealing ring including an outside surface area, said sealing ring seal being positioned to allow more of said outside surface area to be exposed to fluid pressure produced by the fluid pump when said actuation ring is not in the normal position and when said sealing ring is not in sealing contact with said valve body than when said actuation ring is in the normal position and when said sealing ring is in sealing contact with said valve body.

37. The check valve of claim 28, said valve body including an inside chamfer in said valve cavity, said valve cavity having a diameter at said chamfer that increases in size in a downstream direction, said sealing ring being biased to contact said valve body at said chamfer when said actuation ring is in the normal position.

38. The check valve of claim 28, said plug extending across the diameter of said valve cavity at about said outlet end of said valve body, said plug having at least a fluid passage to allow for fluid to pass therethrough.

39. The check valve of claim 28, said tapered section including at least a first tapered segment and at least a second tapered segment, said first tapered segment having an incident angle that is different from an incident angle of said second tapered segment.

40. The check valve of claim 28, said tapered section including at least a first tapered segment and at least a second tapered segment, said second tapered segment having an incident angle that is shallower than an incident angle of said first tapered segment.

41. The check valve of claim 28, said tapered section including at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

42. The check valve of claim 28, said tapered section including at least a first tapered segment, a second tapered segment, and a third tapered segment, said second tapered segment having an incident angle that is shallower than an incident angle of said first tapered segment, and said third tapered segment having an incident angle that is shallower than said incident angle of said second tapered segment.

43. The check valve of claim 28, said tapered section having a curved cross sectional shape.

44. The check valve of claim 28, said tapered section having a curved cross sectional shape at which the slope of said tapered section becomes increasingly shallower in a direction that is downstream of said inlet end and in which a diameter of said tapered section becomes increasingly wider in a direction that is downstream of said inlet end.

45. The check valve of claim 28, said actuation ring having a circular cross shape.

46. The check valve of claim 28, said sealing ring having a circular cross shape.

47. The check valve of claim 28, said sealing ring having a rectangular cross shape.

48. The check valve of claim 28, said sealing ring having a cross sectional shape that is different from a cross sectional shape of said actuation ring.

49. The check valve of claim 28, said actuation ring having constructed of a material selected from the group consisting of viton, nitrile rubber, silicone, Aflas, and EPDM.

50. The check valve of claim 28, said sealing ring being constructed of a material selected from the group consisting of viton, nitrile rubber, silicone, EPDM, Teflon, Rulon, Delrin, PVC, ABS, Stainless Steel, Brass, Aflas, and Aluminum.

51. The check valve of claim 28, the fluid pump being a liquid pump, said sealing ring and said actuation ring comprising materials capable of withstanding liquid fluids.

52. The check valve of claim 28, the fluid pump being a water pump, said sealing ring and said actuation ring comprising materials capable of withstanding water.

53. The check valve of claim 28, the fluid pump being an oil pump, said sealing ring and said actuation ring comprising materials capable of withstanding oil.

54. A check valve for use in an air compressor system that includes an air compressor having a compression cylinder, said check valve comprising:

a valve body having an inlet end through which air enters said check valve and an outlet end through which air exits said check valve, and a valve cavity within said valve body extending between about said inlet end and about said outlet end;

a valve assembly located at a position with respect to said valve cavity which enables said valve assembly to control the flow of air through said valve cavity, said valve assembly including a plug having at least a tapered section and a non-tapered section, said tapered section having a cross section that increases in diameter in a direction that is downstream from said inlet end;

said valve assembly having an sealing ring that is mounted to reciprocate at least along said non-tapered section;

said valve assembly having an elastomeric actuation ring that is mounted to reciprocate at least along said tapered section, said tapered section biasing said actuation ring to a normal position where said actuation ring contacts and positions said sealing ring in contact with said valve body and valve assembly to prevent air from flowing downstream from said inlet end and out said outlet end; and said valve assembly allowing air to flow downstream from said inlet end and out said outlet end of said valve body when the air compressor produces an amount of air pressure necessary to create a force against said sealing ring that is sufficient to cause said sealing ring to exert a force against said actuation ring and to cause said sealing ring to be located at a position away from said valve body to create a preselected clearance between said valve body and said sealing ring.

55. The check valve of claim 54 further comprising an edge at about said outlet end of said valve body, said sealing ring being biased to contact said valve body at said edge when said actuation ring is in the normal position.

56. The check valve of claim 54 further comprising an edge at about said outlet end of said valve body, said edge being formed from a flange extending inwardly in said valve cavity, said actuation ring being biased to position said sealing ring in contact with said valve body at said edge when said actuation ring is in the normal position.

57. The check valve of claim 54 further comprising an edge at about said outlet end of said valve body, said edge being formed from a flange that is a circular washer that is compression fit to be part of said valve body and which extends inwardly into said valve cavity, said actuation ring being biased to position said sealing ring in contact with said valve body at said edge when said actuation ring is in the normal position.

58. The check valve of claim 54, said plug further comprising a shaft that includes four separate fluid passages through which air can flow downstream from said inlet end of said valve body through said valve cavity to said outlet end.

59. The check valve of claim 54 further comprising a pressure chamber that is the portion of said valve cavity that is located upstream of and about adjacent said sealing ring.

60. The check valve of claim 54, said preselected clearance between said sealing ring and said outlet end being sufficiently large to allow a process flow of air from said inlet end through said outlet end of said valve body when the air compressor produces a clearance pressure.

61. The check valve of claim 54, a leakage clearance existing within said check valve to allow for the passage of air from said inlet end through said outlet end when the air compressor produces an air pressure.

62. The check valve of claim 54, said tapered section including a restrictor to restrict further movement of said actuation ring in a direction that is downstream and away from said inlet end of said valve body when said sealing ring is separated from said valve body by a preselected clearance there between.

63. The check valve of claim 54, said sealing ring including an outside surface area, said sealing ring seal being positioned to allow more of said outside surface area to be exposed to air pressure produced by the air compressor when said actuation ring is not in the normal position and when said sealing ring is not in sealing contact with said valve body than when said actuation ring is in the normal position and when said sealing ring is in sealing contact with said valve body.

64. The check valve of claim 54, said valve body including an inside chamfer in said valve cavity, said valve cavity having a diameter at said chamfer that increases in size in a downstream direction, said sealing ring being biased to contact said valve body at said chamfer when said actuation ring is in the normal position.

65. The check valve of claim 54, said plug extending across the diameter of said valve cavity at about said outlet end of said valve body, said plug having at least a fluid passage to allow for air to pass therethrough.

66. The check valve of claim 54, said tapered section including at least a first tapered segment and at least a second tapered segment, said first tapered segment having an incident angle that is different from an incident angle of said second tapered segment.

67. The check valve of claim 54, said tapered section including at least a first tapered segment and at least a second tapered segment, said second tapered segment having an incident angle that is shallower than an incident angle of said first tapered segment.

68. The check valve of claim 54, said tapered section including at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

69. The check valve of claim 54, said tapered section including at least a first tapered segment, a second tapered segment, and a third tapered segment, said second tapered segment having an incident angle that is shallower than an incident angle of said first tapered segment, said third tapered segment having an incident angle that is shallower than said incident angle of said second tapered segment.

70. The check valve of claim 54, said tapered section having a curved cross sectional shape.

71. The check valve of claim 54, said tapered section having a curved cross sectional shape at which the slope of said tapered section becomes increasingly shallower in a direction that is downstream of said inlet end and in which a diameter of said tapered section becomes increasingly wider in a direction that is downstream of said inlet end.

72. The check valve of claim 54, said actuation ring having a circular cross sectional shape.

73. The check valve of claim 54, said sealing ring having a circular cross sectional shape.

74. The check valve of claim 54, said sealing ring having a rectangular cross sectional shape.

75. The check valve of claim 54, said sealing ring having a cross sectional shape that is different from a cross sectional shape of said actuation ring.

76. The check valve of claim 54, said actuation ring being constructed of a material selected from the group consisting of viton, nitrile rubber, silicone, Aflas, and EPDM.

77. The check valve of claim 54, said sealing ring being constructed of a material selected from the group consisting of viton, nitrile rubber, silicone, EPDM, Teflon, Rulon, Delrin, PVC, ABS, Stainless Steel, Brass, Aflas, and Aluminum.

78. A check valve for use in an air compressor system that includes an air compressor having a compression cylinder, said check valve comprising:
   a valve body having an inlet end through which air enters said check valve and an outlet end through which air exits said check valve, and a valve cavity within said valve body extending between about said inlet end and about said outlet end;
   a valve assembly located at a position with respect to said valve cavity which enables said valve assembly to control the flow of air through said valve cavity, said valve assembly including a plug having at least a tapered section and a non-tapered section, said tapered section having a cross section that increases in diameter in a direction that is downstream from said inlet end;
   said valve assembly having an sealing ring that is mounted to reciprocate at least along said non-tapered section;
   said valve assembly having an elastomeric actuation ring that is mounted to reciprocate at least along said tapered section, said tapered section biasing said actuation ring to a normal position where said actuation ring contacts and positions said sealing ring in contact with said valve body and said valve assembly to prevent air from flowing downstream from said inlet end and out said outlet end;

said valve assembly allowing air to flow downstream from said inlet and out said outlet end of said valve body when the air compressor produces an amount of air pressure necessary to create a force against said sealing ring that is sufficient to cause said sealing ring to exert a force against said actuation ring and to cause said sealing ring to be located at a position away from said valve body to create a preselected clearance between said valve body and said sealing ring; and a portion of said valve cavity, between about said inlet end and about the location where said sealing ring contacts said valve body, having a minimum cross sectional area that allows the pressure of the air flowing through said preselected clearance to be sufficient to continuously remove air from said valve cavity to prevent substantial accumulation of back pressure produced by the air compressor upstream of said valve when repeated cycles of the compression cylinder of said air compressor repeatedly cause said sealing ring to be located at a position away from said valve body and create the preselected clearance between said valve body and said sealing ring.

79. The check valve of claim 78 further comprising an edge at about said outlet end of said valve body, said sealing ring being biased to contact said valve body at said edge when said actuation ring is in the normal position.

80. The check valve of claim 78 further comprising an edge at about said outlet end of said valve body, said edge being formed from a flange extending inwardly in said valve cavity, said actuation ring being biased to position said sealing ring in contact with said valve body at said edge when said actuation ring is in the normal position.

81. The check valve of claim 78 further comprising an edge at about said outlet end of said valve body, said edge being formed from a flange that is a circular washer that is compression fit to be part of said valve body and which extends inwardly into said valve cavity, said actuation ring being biased to position said sealing ring in contact with said valve body at said edge when said actuation ring is in the normal position.

82. The check valve of claim 78, said plug further comprising a shaft that includes four separate fluid passages through which air can flow downstream from said inlet end of said valve body through said valve cavity to said outlet end.

83. The check valve of claim 78 further comprising a pressure chamber that is the portion of said valve cavity that is located upstream of and about adjacent said sealing ring.

84. The check valve of claim 78, said preselected clearance between said sealing ring and said outlet end being sufficiently large to allow a process flow of air from said inlet end through said outlet end of said valve body when the air compressor produces a clearance pressure.

85. The check valve of claim 78, said tapered section including a restrictor to restrict further movement of said actuation ring in a direction that is downstream and away from said inlet end of said valve body when said sealing ring is separated from said valve body by a preselected clearance there between.

86. The check valve of claim 78, said sealing ring including an outside surface area, said sealing ring seal being positioned to allow more of said outside surface area to be exposed to air pressure produced by the air compressor when said actuation ring is not in the normal position and when said sealing ring is not in sealing contact with said valve body than when said actuation ring is in the normal position and when said sealing ring is in sealing contact with said valve body.

87. The check valve of claim 78, said valve body including an inside chamfer in said valve cavity, said valve cavity having a diameter at said chamfer that increases in size in a downstream direction, said sealing ring being biased to contact said valve body at said chamfer when said actuation ring is in the normal position.

88. The check valve of claim 78, said plug extending across the diameter of said valve cavity at about said outlet end of said valve body, said plug having at least a fluid passage to allow for air to pass therethrough.

89. The check valve of claim 78, said tapered section including at least a first tapered segment and at least a second tapered segment, said first tapered segment having an incident angle that is different from an incident angle of said second tapered segment.

90. The check valve of claim 78, said tapered section including at least a first tapered segment and at least a second tapered segment, said second tapered segment having an incident angle that is shallower than an incident angle of said first tapered segment.

91. The check valve of claim 78, said tapered section including at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

92. The check valve of claim 78, said tapered section including at least a first tapered segment, a second tapered segment, and a third tapered segment, said second tapered segment having an incident angle that is shallower than an incident angle of said first tapered segment, said third tapered segment having an incident angle that is shallower than said incident angle of said second tapered segment.

93. The check valve of claim 78, said tapered section having a curved cross sectional shape.

94. The check valve of claim 78, said tapered section having a curved cross sectional shape at which the slope of said tapered section becomes increasingly shallower in a direction that is downstream of said inlet end and in which a diameter of said tapered section becomes increasingly wider in a direction that is downstream of said inlet end.

95. The check valve of claim 78, said actuation ring having a circular cross sectional shape.

96. The check valve of claim 78, said sealing ring having a circular cross sectional shape.

97. The check valve of claim 78, said sealing ring having a rectangular cross sectional shape.

98. The check valve of claim 78, said sealing ring having a cross sectional shape that is different from a cross sectional shape of said actuation ring.

99. The check valve of claim 78, said actuation ring being constructed of a material selected from the group consisting of viton, nitrile rubber, silicone, Aflas and EPDM.

100. The check valve of claim 78, said sealing ring being constructed of a material selected from the group consisting of viton, nitrile rubber, silicone, EPDM, Teflon, Rulon, Delrin, PVC, ABS, Stainless Steel, Brass, Aflas, and Aluminum.

101. A check valve for use in a fluid system that includes a fluid pump for moving a fluid, said check valve comprising:
a valve body having an inlet end through which fluid enters said check valve and an outlet end through which fluid exits said check valve, and a valve cavity within said valve body extending between about said inlet end and about said outlet end;
a valve assembly located at a position with respect to said valve cavity which enables said valve assembly to control the flow of fluid through said valve cavity, said valve assembly including a plug having at least a tapered section and a non-tapered section, said plug having a shaft that includes four separate fluid passages through which fluid can flow downstream from said inlet end of said valve body through said valve cavity to said outlet end, said tapered section having a cross section that increases in diameter in a direction that is downstream from said inlet end;

said valve assembly having a sealing ring that is mounted to reciprocate at least along said non-tapered section;

said valve assembly having an elastomeric actuation ring that is mounted to reciprocate at least along said tapered section, said tapered section biasing said actuation ring to a normal position where said actuation ring contacts and positions said sealing ring in contact with said valve body and said valve assembly to prevent fluid from flowing downstream from said inlet end and out said outlet end;

an edge at about said outlet end of said valve body, said sealing ring being biased to contact said valve body at said edge when said actuation ring is in the normal position;

a pressure chamber that is the portion of said valve cavity that is located upstream of and about adjacent said sealing ring;

said valve assembly allowing fluid to flow downstream from said inlet and out said outlet end of said valve body when the fluid pump produces an amount of fluid pressure necessary to create a force against said sealing ring that is sufficient to cause said sealing ring to exert a force against said actuation ring and to cause said sealing ring to be located at a position away from said valve body to create a preselected clearance between said valve body and said sealing ring, said preselected clearance being sufficiently large to allow a process flow of fluid from said inlet end through said outlet end of said valve body when the fluid pump produces a clearance pressure;

said tapered section including a restrictor to restrict further movement of said actuation ring in a direction that is downstream and away from said inlet end of said valve body when said sealing ring is separated from said valve body by said preselected clearance there between;

said sealing ring including an outside surface area, said sealing ring seal being positioned to allow more of said outside surface area to be exposed to fluid pressure produced by the fluid pump when said actuation ring is not in the normal position and when said sealing ring is not in sealing contact with said valve body than when said actuation ring is in the normal position and when said sealing ring is in sealing contact with said valve body;

said valve body having an inside chamfer in said valve cavity, said valve cavity having a diameter at said chamfer that increases in size in a downstream direction, said sealing ring being biased to contact said valve body at said chamfer when said actuation ring is in the normal position; and a portion of said valve cavity, between about said inlet end and about the location where said sealing ring contacts said valve body, having a minimum cross sectional area that allows the pressure of the fluid flowing through said preselected clearance to be sufficient to continuously remove fluid from said valve cavity to prevent substantial accumulation of back pressure produced by the fluid pump upstream of said valve when continuous operation of the fluid pump repeatedly causes said sealing ring to be located at a position away from said valve body and create said preselected clearance between said valve body and said sealing ring.

102. A check valve for use in an air compressor system that includes an air compressor having a compression cylinder, said check valve comprising:

a valve body having an inlet end through which air enters said check valve and an outlet end through which air exits said check valve, and a valve cavity within said valve body extending between about said inlet end and about said outlet end;

a valve assembly located at a position with respect to said valve cavity which enables said valve assembly to control the flow of air through said valve cavity, said valve assembly including a plug having at least a tapered section and a non-tapered section, said plug having a shaft that includes four separate fluid passages through which air can flow downstream from said inlet end of said valve body through said valve cavity to said outlet end, said tapered section having a cross section that increases in diameter in a direction that is downstream from said inlet end;

said valve assembly having a sealing ring that is mounted to reciprocate at least along said non-tapered section;

said valve assembly having an elastomeric actuation ring that is mounted to reciprocate at least along said tapered section, said tapered section biasing said actuation ring to a normal position where said actuation ring contacts and positions said sealing ring in contact with said valve body and said valve assembly to prevent air from flowing downstream from said inlet end and out said outlet end;

an edge at about said outlet end of said valve body, said sealing ring being biased to contact said valve body at said edge when said actuation ring is in the normal position;

a pressure chamber that is the portion of said valve cavity that is located upstream of and about adjacent said sealing ring;

said valve assembly allowing air to flow downstream from said inlet and out said outlet end of said valve body when the air compressor produces an amount of air pressure necessary to create a force against said sealing ring that is sufficient to cause said sealing ring to exert a force against said actuation ring and to cause said sealing ring to be located at a position away from said valve body to create a preselected clearance between said valve body and said sealing ring, said preselected clearance being sufficiently large to allow a process flow of air from said inlet end through said outlet end of said valve body when the air compressor produces a clearance pressure;

said tapered section including a restrictor to restrict further movement of said actuation ring in a direction that is downstream and away from said inlet end of said valve body when said sealing ring is separated from said valve body by said preselected clearance there between;

said sealing ring including an outside surface area, said sealing ring seal being positioned to allow more of said outside surface area to be exposed to air pressure produced by the air compressor when said actuation ring is not in the normal position and when said sealing ring is not in sealing contact with said valve body than when said actuation ring is in the normal position and when said sealing ring is in sealing contact with said valve body;

said valve body having an inside chamfer in said valve cavity, said valve cavity having a diameter at said chamfer that increases in size in a downstream direction, said sealing ring being biased to contact said valve body at said chamfer when said actuation ring is in the normal position; and a portion of said valve cavity, between about said inlet end and about the location where said sealing ring contacts said valve body, having a minimum cross sectional area that allows the pressure of the air flowing through said preselected clearance to be sufficient to continuously remove air from said valve cavity to prevent substantial accumulation of back pressure produced by the air compressor upstream of said valve when continuous operation of the air compressor repeatedly causes said sealing ring to be located at a position away from said valve body and create said preselected clearance between said valve body and said sealing ring.

* * * * *